(12) United States Patent
Stiegman

(10) Patent No.: US 9,676,908 B2
(45) Date of Patent: Jun. 13, 2017

(54) HIGH REFRACTIVE INDEX POLYMERS

(71) Applicant: Florida State University Research Foundation, Inc., Tallahassee, FL (US)

(72) Inventor: Albert Stiegman, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 60 days.

(21) Appl. No.: 14/643,340

(22) Filed: Mar. 10, 2015

(65) Prior Publication Data
US 2015/0183937 A1    Jul. 2, 2015

Related U.S. Application Data

(60) Division of application No. 13/918,232, filed on Jun. 14, 2013, now Pat. No. 8,975,356, which is a continuation of application No. 12/850,141, filed on Aug. 4, 2010, now Pat. No. 8,470,948.

(60) Provisional application No. 61/237,897, filed on Aug. 28, 2009.

(51) Int. Cl.
| | | |
|---|---|---|
| C08F 26/06 | (2006.01) | |
| C08G 77/60 | (2006.01) | |
| C08G 73/06 | (2006.01) | |
| C08L 79/04 | (2006.01) | |
| C08L 83/16 | (2006.01) | |
| C08G 75/045 | (2016.01) | |
| C08G 77/00 | (2006.01) | |
| C08G 79/00 | (2006.01) | |

(52) U.S. Cl.
CPC ......... *C08G 77/60* (2013.01); *C08G 73/0638* (2013.01); *C08G 73/0655* (2013.01); *C08G 75/045* (2013.01); *C08G 77/00* (2013.01); *C08G 79/00* (2013.01); *C08L 79/04* (2013.01); *C08L 83/16* (2013.01)

(58) Field of Classification Search
CPC .................................................... C08F 26/06
See application file for complete search history.

(56) References Cited

U.S. PATENT DOCUMENTS

| | | |
|---|---|---|
| 3,625,925 A | 12/1971 | Oswald et al. |
| 3,653,959 A | 4/1972 | Kehr et al. |
| 3,697,621 A | 10/1972 | Kehr et al. |
| 4,234,676 A | 11/1980 | Hein et al. |
| 4,443,495 A | 4/1984 | Morgan et al. |
| 4,609,762 A | 9/1986 | Morris et al. |
| 4,808,638 A | 2/1989 | Steinkraus et al. |
| 5,371,181 A | 12/1994 | Glaser et al. |
| 5,407,972 A | 4/1995 | Smith et al. |
| 5,543,482 A | 8/1996 | Shimuta et al. |
| 5,585,035 A | 12/1996 | Nerad et al. |
| 5,753,730 A | 5/1998 | Nagata et al. |
| 5,876,595 A | 3/1999 | Hanggi et al. |
| 5,876,805 A | 3/1999 | Ostlie |
| 5,889,132 A | 3/1999 | Rheinberger et al. |
| 5,908,876 A | 6/1999 | Fujii et al. |
| 5,916,987 A | 6/1999 | Kobayashi et al. |
| 5,955,206 A | 9/1999 | Okazaki et al. |
| 5,969,867 A | 10/1999 | Fukushima et al. |
| 5,976,422 A | 11/1999 | Okoroafor et al. |
| 5,977,276 A | 11/1999 | Toh et al. |
| 6,031,012 A | 2/2000 | Nakanishi et al. |
| 6,153,663 A | 11/2000 | Chen et al. |
| 6,184,323 B1 | 2/2001 | Jiang |
| 6,310,161 B1 | 10/2001 | Weissman |
| 6,313,251 B1 | 11/2001 | Toh et al. |
| 6,342,571 B1 | 1/2002 | Smith et al. |
| 6,472,451 B2 | 10/2002 | Ha et al. |
| 6,506,814 B2 | 1/2003 | Krongauz et al. |
| 6,533,815 B1 | 3/2003 | Widawski |
| 6,551,710 B1 * | 4/2003 | Chen ..................... C08F 246/00 428/412 |

(Continued)

FOREIGN PATENT DOCUMENTS

| | | |
|---|---|---|
| EP | 0598551 | 5/1994 |
| WO | 95/00577 | 1/1995 |

(Continued)

OTHER PUBLICATIONS

Lu et al. (Dental Materials, 2005, 21, 1129-1136).*
Senyurt et al. (Macromolecules 2007, 40, 3174-3182).*
Chan et al., "Photopolymerization of Thiol-Alkynes: Polysulfide Networks", Chem. Mater., 2009, 21, pp. 1579-1585.
Fairbanks et al., "Thiol-Yne Photopolymerizations: Novel Mechanism, Kinetics, and Step-Growth Formation of Highly Cross-Linked Networks", Macromolecules, 2009, 42, pp. 211-217.
Hoyle et al., "Thiol-Enes: Chemistry of the Past with Promise for the Future", Journal of Polymer Science: Part A: Polymer Chemistry, 2004, vol. 42, pp. 5301-5338.
Kobayashi et al., "Polyaddition of Dithiol Compounds to Divinyl Compounds: The Kinetics of the Model Addition Reaction of Thiophenols to Styrenes", Polymer Journal, 1990, vol. 22, No. 9, pp. 803-813.
Rissing et al., Review "Thiol-ene Chemistry of Vinylsilanes", 2009, vol. 8, No. 4, pp. 251-262.
Cramer et al., "Mechanism and Modeling of a Thiol-Ene Photopolymerization", Macromolecules 2003, 36, pp. 4631-4636.

*Primary Examiner* — Liam J Heincer
(74) *Attorney, Agent, or Firm* — Senniger Powers LLP

(57) ABSTRACT

A polymer and a method of forming a polymer are provided. The polymer has the general structure (I):

Structure (I)

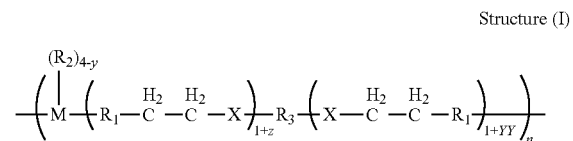

wherein M is an organic moiety; X is a main group element selected from S, P, As, Se, Te, and Sb; $R_1$ is a direct bond between M and the ethylene group depicted between M and X or a hydrocarbyl linking moiety having between 1 and about 9 carbon atoms; $R_2$ is a hydrocarbyl moiety; $R_3$ is an organic linking group; Y has a value of 0, 1, 2, 3, or 4; Z has a value of 0, 1, 2, 3, or 4; YY has a value of 0, 1 or 2; and Y, YY, and Z are such that the total number of moieties bonded to M is 3, 4, 5, or 6.

13 Claims, 1 Drawing Sheet

(56) References Cited

U.S. PATENT DOCUMENTS

| | | |
|---|---|---|
| 6,596,841 B2 | 7/2003 | Tanaka et al. |
| 6,605,689 B1 | 8/2003 | Gross et al. |
| 6,605,690 B1 | 8/2003 | Gross et al. |
| 6,605,691 B1 | 8/2003 | Gross et al. |
| 6,605,692 B1 | 8/2003 | Gross et al. |
| 6,669,873 B1 | 12/2003 | Smith et al. |
| 6,872,333 B2 | 3/2005 | Ishii et al. |
| 7,026,372 B2 | 4/2006 | Ishii et al. |
| 7,521,015 B2 | 4/2009 | Cheng et al. |
| 7,582,685 B2 | 9/2009 | Arney et al. |
| 7,867,577 B2 | 1/2011 | Biteau et al. |
| 2003/0021566 A1 | 1/2003 | Shustack et al. |
| 2006/0069176 A1 | 3/2006 | Bowman et al. |
| 2006/0128826 A1 | 6/2006 | Ellison et al. |
| 2006/0264583 A1 | 11/2006 | Kashiwagi et al. |
| 2007/0129509 A1 | 6/2007 | Li et al. |
| 2007/0142551 A1 | 6/2007 | Kunzler et al. |
| 2007/0185230 A1* | 8/2007 | Bowman ............ A61K 6/083 523/115 |
| 2008/0143958 A1 | 6/2008 | Medina et al. |
| 2008/0194721 A1 | 8/2008 | Arney et al. |
| 2009/0096136 A1 | 4/2009 | Hawker et al. |
| 2009/0098082 A1 | 4/2009 | Wilson et al. |
| 2009/0287015 A1 | 11/2009 | Biteau et al. |
| 2010/0331515 A1 | 12/2010 | Takeuchi et al. |

FOREIGN PATENT DOCUMENTS

| | | |
|---|---|---|
| WO | 96/38486 | 12/1996 |
| WO | 97/44372 | 11/1997 |
| WO | 98/38146 | 9/1998 |
| WO | 2007/128071 | 11/2007 |

* cited by examiner

HIGH REFRACTIVE INDEX POLYMERS

REFERENCE TO RELATED APPLICATIONS

This application is a divisional of U.S. patent application Ser. No. 13/918,232, filed Jun. 14, 2013, issued Mar. 10, 2015 as U.S. Pat. No. 8,975,356, which is a continuation of U.S. patent application Ser. No. 12/850,141, filed Aug. 4, 2010, issued Jun. 25, 2013 as U.S. Pat. No. 8,470,948, which claims priority from U.S. provisional application Ser. No. 61/237,897, which was filed Aug. 28, 2009, the entire disclosures of which are incorporated herein by reference.

FIELD OF THE INVENTION

The present invention generally relates to a high refractive index material comprising a polymer having a high degree of cross-linking and containing polarizable elements. The present invention further relates to a method for preparing high refractive index, transparent materials.

BACKGROUND OF THE INVENTION

Organic polymers are used for many optical applications, the largest being in the area of consumer eyewear. In this application, organic polymers afford a variety of properties including low density and resistance to impacts and scratches. Organic polymers may also be processed into what are referred to as progressive lenses that have a graded refractive index to accommodate both near-sighted and far-sighted corrections. The organic polymers typically used in contemporary eyewear applications are commonly, but not exclusively, composed of polymethracrylates, polycarbonates, or polythiourethanes. The optical parameters of importance in the choice of polymer for this application are the refractive index, Abbe number, and optical clarity. Materials currently in use typically are in the refractive index range ("R.I.") of 1.65-1.68, though materials with R.I. of 1.70 or above have been synthesized. The Abbe number represents the chromatic dispersion of light, which is the refractive index, measured at specific wavelengths (specifically the Fraunhofer d, f, and c wavelengths). The Abbe number is inversely proportional to the chromatic dispersion. It generally varies between 60, which translates to a very low chromatic dispersion and 30, which is a highly chromatic material. For eyewear applications, the Abbe numbers in the range of 35-40 are acceptable and are typical for the organic polymers used.

For optical applications in general and eyewear in particular, the synthesis of new polymers with refractive indices >1.65 and acceptable Abbe numbers is of considerable importance. Higher refractive index materials will permit smaller, lighter weight lenses to be used and provide a much broader graded index for progressive lenses. The material modification that leads to higher refractive indices is the incorporation of highly polarizable atoms and ions. Incorporating such polarizable groups has been the standard protocol used to develop new high R.I. polymers. The electronic polarizability is a tensor property of an atom or molecule that measures the distortion of the electron cloud in the presence of an applied electric field (which can be an optical field). The more the electron cloud can be distorted, the higher the refractive index. The characteristics of atomic and molecular electronic structure that yield large polarizabilities are well understood and can be predicted from basic chemical principles. In particular, the more electronegative an atom is the less polarizable it will be, hence late first-row elements such as F, O and N tend to yield lower refractive index materials. Better choices are $2^{nd}$, $3^{rd}$ or $4^{th}$ row main group elements such as S (which is currently used in order to increase the refractive index in many polymeric materials), P, and Sn. From a molecular standpoint, the higher electronegativity of the first row can be overcome by delocalization of the electrons across several atoms. Aromatics are more polarizable than saturated hydrocarbons and compounds such as propylene carbonate and dimethylformamide have high dielectric constants.

SUMMARY OF THE INVENTION

Briefly, the present invention is directed to a composition comprising a polymer having the general structure (I):

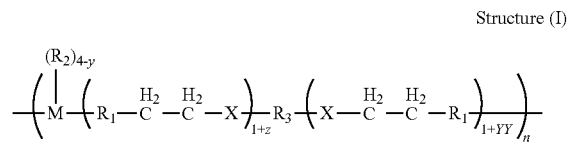

Structure (I)

In the polymer having general structure (I), M is a main group element, a transition metal element, or an organic moiety; X is a main group element selected from the group consisting of S, P, As, Se, Te, Sb, and combinations thereof; $R_1$ is, independently of any other $R_1$ in the polymer, a direct bond between M and the ethylene group depicted between M and X or a hydrocarbyl linking moiety having between 1 and about 9 carbon atoms; $R_2$ is a hydrocarbyl moiety having between 1 and about 9 carbon atoms; $R_3$ is an organic linking group; Y has a value of 0, 1, 2, 3, or 4; Z has a value of 0, 1, 2, 3, or 4; YY has a value of 0, 1 or 2; and Y, YY, and Z are such that the total number of moieties bonded to M is 3, 4, 5, or 6.

The present invention is further directed to a method of preparing a polymer having the general structure (I):

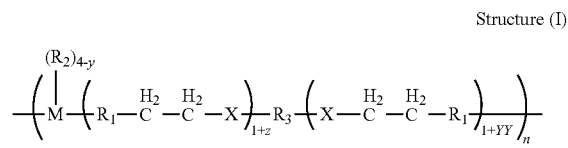

Structure (I)

In the polymer having general structure (I), M is a main group element, a transition metal element, or an organic moiety; X is a main group element selected from the group consisting of S, P, As, Se, Te, Sb, and combinations thereof; $R_1$ is, independently of any other $R_1$ in the polymer, a direct bond between M and the ethylene group depicted between M and X or a hydrocarbyl linking moiety having between 1 and about 9 carbon atoms; $R_2$ is a hydrocarbyl moiety having between 1 and about 9 carbon atoms; $R_3$ is an organic linking group; Y has a value of 0, 1, 2, 3, or 4; Z has a value of 0, 1, 2, 3, or 4; YY has a value of 0, 1 or 2; and Y, YY, and Z are such that the total number of moieties bonded to M is 3, 4, 5, or 6.

The method of forming the polymer comprises reacting a first multifunctional monomer comprising vinyl groups having general structure (IV):

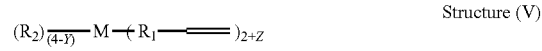

Structure (V)

with a second multifunctional monomer comprising groups that are reactive with vinyl groups having general structure (XXIII):

   Structure (XXIII).

M, $R_1$, $R_2$, $R_3$, X, Y, YY, and Z are as defined in connection with Structure (I).

Other objects and features will be in part apparent and in part pointed out hereinafter.

BRIEF DESCRIPTION OF THE DRAWINGS

The FIGURE is a photograph of a transparent monolith of a material made from reacting tetravinylsilane and ethane-1,2-dithiol.

DETAILED DESCRIPTION OF THE EMBODIMENT(S) OF THE INVENTION

The present invention is generally directed to a high molecular weight bulk polymer having high refractive index. In one aspect, the present invention is directed to a high refractive index material comprising a polymer having a high degree of cross-linking and containing polarizable elements. The present invention further relates to a method for preparing high refractive index transparent materials.

In some embodiments, the present invention is directed to a method for preparing a high refractive index material comprising an organic/inorganic hybrid polymer having a high degree of cross-linking and comprising organic and inorganic moieties. In general, an organic/inorganic hybrid polymer comprises repeat units comprising atoms typically found in organic and biochemical molecules, in particular, carbon, hydrogen, sulfur, nitrogen, and oxygen in addition to atoms that are transition metal elements or main group elements, for example, Si, Ge, As, Se, Te, and Sb. In some preferred embodiments, the organic/inorganic hybrid polymer having a high degree of cross-linking and comprising organic and inorganic moieties is prepared by thiol-ene addition reactions. Accordingly, in some preferred embodiments, the repeat units of the polymer comprise thiol-ene addition products.

In some embodiments, the present invention is directed to a method for preparing a high refractive index material comprising an organic polymer having a high degree of cross-linking Transition metal elements and main group elements other than carbon, hydrogen, sulfur, nitrogen, and oxygen are generally not present in the organic polymers of the present invention, although their presence is not excluded. By "organic" it is meant that the polymer generally comprises carbon-based repeat units and has characteristics typical of organic polymers. As is known, organic polymers generally comprise H, C, S, N, and O, but may also comprise transition metals and main group elements other than H, C, S, N, and O. Transition metal elements and main group elements other than carbon, hydrogen, sulfur, nitrogen, and oxygen are thus generally not present in the organic polymers of the present invention, although their presence is not excluded. In some preferred embodiments, the organic polymer having a high degree of cross-linking is prepared by thiol-ene addition reactions. Accordingly, in some preferred embodiments, the repeat units of the polymer comprise thiol-ene addition products.

In some preferred embodiments, the repeat units of the polymers of the present invention are established by a thiol-ene addition reaction. Thiol-ene reactions involve the addition of an R—S—H bond across a double or triple bond by either a free radical or ionic mechanism. Thiol-ene reactions covalently bond the monomers into repeat units and are used in the present invention for preparing a high molecular weight polymer having properties useful for preparing lens materials and flexible light guides. In some embodiments, the repeat units of the polymers of the present invention are formed by the reaction of polarizable groups terminated with thiol or vinyl or thiol and vinyl groups to covalently bond through thiol-vinyl addition chemistry into the repeat units of a high polymer. The high molecular weight polymers of the present invention that are derived from the thiol-ene addition reaction are characterized by high refractive indices and high Abbe numbers.

In some embodiments, the highly cross-linked polymer of the present invention is a high refractive index material. Both highly cross-linked, organic/inorganic hybrid polymers and highly cross-linked, organic polymers have been prepared to have high refractive indices. Such materials, when manufactured to have a high degree of hardness, are particularly useful in optical application, such as lenses. The highly cross-linked polymer of the present invention may be manufactured to a refractive index of at least 1.55, and in some embodiments, the refractive index of the material comprising the cross-linked polymer of the present invention is at least 1.60, such as at least 1.65, at least 1.70, at least 1.75, or even at least 1.80. In some embodiments, a high refractive index of the materials of the present invention is achieved by limiting the proportion of or even excluding electronegative atoms having electronegativities above about 2.65 (Pauling scale), such as oxygen, nitrogen, fluoride, chloride and the like in the cross-linked polymer of the present invention. While some electronegative atoms may be present in a cross-linked polymer and the goal of high refractive index may still be achieved, preferably, electronegative atoms are excluded from the cross-linked polymer of the present invention. In some embodiments, moieties comprising electronegative atoms, such as oxygen and nitrogen, are included in the repeat units of the polymer, and although the refractive index may slightly lower compared to polymers without such atoms, it has been found that the inclusion of these moieties results in polymers having excellent mechanical properties, such as flexibility.

In some embodiments, the highly cross-linked polymer of the present invention has an Abbe number of at least 30, such as at least 32, at least 34, at least 36, or even at least 38. Both cross-linked, organic/inorganic hybrid polymers and cross-linked, organic polymers have been prepared having high Abbe numbers. A particular advantage of the cross-linked polymer of the present invention of the present invention is the achievement of a material that combines a high refractive index with a higher Abbe number than is normally associated with high refractive index materials. The cross-linked polymer of the present invention therefore may be particular useful for fabricating corrective lenses, i.e., eyeglasses.

In one preferred embodiment, the material of the present invention has a refractive index of at least 1.65 combined with an Abbe number of at least 38.

In some embodiments, the highly cross-linked polymer of the present invention has a high degree of microhardness, which also contributes to its usefulness as a lens material, e.g., for corrective lenses. In some embodiments, the cross-linked polymer of the present invention has been manufactured into a flexible material which is important for ophthalmic implants such as interocular lens in which a foldable optic that opens upon insertion minimizes the size of the surgical incision required.

In some embodiments, the highly cross-linked polymer of the present invention has a high degree of flexibility, which is useful for applications where a flexible, high refractive index material is desirable, such as flexible light guides, optoelectron fabrication, optical adhesives, encapsulants for organic Light Emitting Diode (LED) devices, microlens components for charge couple devices (CCD).

The cross-linked polymer of the present invention has the general structure (I):

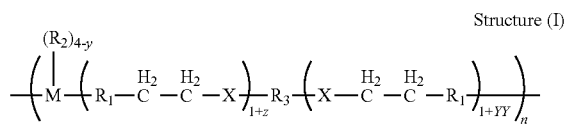

Structure (I)

In some embodiments of structure (I), M is a main group element capable of achieving a coordination number of 3, 4, 5, or 6. In some embodiments of structure (I), M is a transition metal element capable of achieving a coordination number of 3, 4, 5, or 6. Stated another way, in embodiments wherein M is a main group element or a transition metal element, the M moiety can achieve a trivalent coordination sphere, tetravalent coordination sphere, pentavalent coordination sphere, or a hexavalent coordination sphere. In some embodiments of Structure (I), M is an organic moiety bonded to three or more substituents as are depicted in Structure (I), preferably at least four substituents.

In some preferred embodiments, M is the transition metal element and is capable of achieving a coordination number of 3 (trivalent coordination sphere). In some preferred embodiments, M is the transition metal element and is capable of achieving a coordination number of 4 (tetravalent coordination sphere). In embodiments wherein M is a transition metal element, the polymer of the present invention is a highly cross-linked, organic/inorganic hybrid polymer. In some preferred embodiments, the transition metal may be selected from among Mn, Zr, Ti, and Cr.

In some embodiments, M is a main group element capable of achieving a coordination number of 3 (trivalent coordination sphere). In some embodiments, M is a main group element capable of achieving a coordination number of 4 (tetravalent coordination sphere). In embodiments wherein M is a main group element, the polymer of the present invention is a highly cross-linked, organic/inorganic hybrid polymer. Preferably, the main group element capable of forming a trivalent or tetravalent coordination sphere is a second, third, or fourth row main group element having an electronegativity less than 2.65 (Pauling scale). In some preferred embodiments, the main group elements may be selected from among Si, Ge, or Sn.

In some embodiments of structure (I), M is an organic moiety bonded to the substituents shown in Structure (I). In some embodiments wherein M is an organic moiety, the polymer of the present invention is the cross-linked, organic polymer. In some preferred embodiments of structure (I), M is derived from an organic moiety comprising at least two substituents comprising ethylene moieties, e.g., carbon-carbon double bonds having the structure —C=C—, such as vinyl or allyl groups, preferably at least three substituents comprising ethylene moieties.

In structure (I), the coordination number, i.e., the number of substituents bonded thereto, of M is dictated by the values of Y, YY, and Z. Y may have a value of 0, 1, 2, 3 or 4. Preferably, Y has a value of 4 such that there are no $R_2$ groups. In structure (I), Z may have a value of 0, 1, 2, 3 or 4. Preferably, Z has a value of 1 or 2. In structure (I), YY may have a value of 0, 1, or 2. Preferably, YY has a value of 0. The values of Y, YY, and Z may be such that the M moiety has bonded thereto 3, 4, 5, or 6 substituent moieties. Preferably, the values of Y, YY, and Z are such that the total number of moieties bonded to M is 3 (e.g., M is a transition metal element or main group element that forms a trivalent coordination sphere or M is an organic moiety having three substituents) or 4 (e.g., M is a transition metal element or main group element that forms a tetravalent coordination sphere or M is an organic moiety having four substituents).

As stated above, preferably, Z has a value of 1 or 2 and YY has a value of 0, such that there are 3 or 4 moieties having the structure $-\!\!(\!R_1\!-\!CH_2\!-\!CH_2\!-\!X)\!\!-$ bonded to M.

In structure (I), X is a main group element selected from among S, P, As, Se, Te, Sb, and combinations thereof. In some preferred embodiments wherein X is a main group element, X is selected from among S, Se, or Te. In some preferred embodiments wherein X is a main group element, X is sulfur.

In structure (I), the $R_1$ moiety is, independently of any other $R_1$ in the polymer, a direct bond between M and the ethylene group depicted between M and X or a hydrocarbyl linking moiety having between 1 and about 9 carbon atoms, such as methylene, ethylene, n-propylene, iso-propylene, n-butylene, iso-butylene, tert-butylene, n-pentylene, isopentylene, neopentylene, hexylenes, heptylenes, octylenes, and nonylenes. In preferred embodiments, each $R_1$ moiety is identical. In some preferred embodiments, $R_1$ is a direct bond between M and the ethylene group depicted between $R_1$ and X. In some preferred embodiments, $R_1$ is a hydrocarbyl linking moiety having between 1 and 4 carbon atoms, such as methylene, ethylene, n-propylene, iso-propylene, n-butylene, iso-butylene, and tert-butylene. In some preferred embodiments, $R_1$ is methylene.

In structure (I), $R_2$ is a hydrocarbyl moiety, e.g., alkyls, alkenyls, alkynyls, aryls, and aralkyls, having between 1 and about 9 carbon atoms. As stated above, in structure (I), Y may have a value of 0, 1, 2, 3 or 4. In preferred embodiments, Y is 4, and the $R_2$ moiety is not present in the polymer generally depicted by Structure (I).

In structure (I), $R_3$ is an organic linking group that links together X main group elements, the organic linking group may be either a hydrocarbyl, e.g., alkyl, alkenyl, alkynyl, aryl, or aralkyl, or may be any of alkyl, alkenyl, alkynyl, aryl, or aralkyl further comprising heteroatoms.

In some embodiments, $R_3$ is an organic linking group that is a hydrocarbyl, such as an alkyl, substituted alkyl, cycloalkyl, substituted cycloalkyl, alkenyl, substituted alkenyl, alkynyl, substituted alkynyl, aryl, or substituted aryl. Alkyl $R_3$ linking groups generally have between 1 and about 10 carbon atoms, preferably between 1 and 5 carbon atoms. Exemplary alkyl linking groups include methylene, ethylene, n-propylene, iso-propylene, n-butylene, iso-butylene, tert-butylene, n-pentylene, isopentylene, neopentylene, hexylenes, heptylenes, octylenes, nonylenes, and decylenes. Preferred alkyl linking groups include methylene, ethylene, n-propylene, iso-propylene, n-butylene, iso-butylene, tert-butylene, n-pentylene, isopentylene, and neopentylene. With regard to cycloalkyl, alkenyl, alkynyl, and aryl linking groups, the number of carbon atoms may be greater, such as between 2 and about 24 carbon atoms, preferably between 2 and about 20 carbon atoms, more preferably between 2 and about 14 carbon atoms. Exemplary cycloalkyl linking groups include cyclopentyl, cyclohexyl, cycloheptyl, cyclooctyl, and the like. Exemplary aryl groups include phenyls, biphenyls, naphthyls, anthracenyls, phenanthrenyls, and the like. The use of alkenyl, alkynyl, and aryl linking groups is particularly advantageous since these linking groups incorporate unsaturated bonds into to the cross-linked polymer, which has been found to increase the refractive index of the resultant material. This effect is particularly achieved when the linking group incorporates conjugated double and triple bonds into the resultant material. Linking groups comprising conjugated doubled and triple bonds include alkenyl, alkynyl, or aryl in which the number of conjugated double bonds is at least two, such as between 2 and 16, preferably between 2 and about 10, or preferably between 2 and about 5. A high number of conjugated double bonds and aromatic groups may result in a less rigid polymer and may also result in the material becoming colored, which is disadvantageous for applications such as corrective lenses.

In some embodiments, $R_3$ is an organic linking group that may be an alkyl, substituted alkyl, alkenyl, substituted alkenyl, alkynyl, substituted alkynyl, aryl, or substituted aryl further comprising a hetero atom. In some embodiments, the hetero atom is preferably a main group element selected from the group consisting of S, P, As, Se, Ge, Sn, In, Eb, Te.

In some embodiments, $R_3$ is an organic linking group that may be an alkyl, substituted alkyl, alkenyl, substituted alkenyl, alkynyl, substituted alkynyl, aryl, or substituted aryl further comprising a hetero atom. In some embodiments, the hetero atom is preferably a transition metal element selected from the group consisting of Mn, Fe Co, Ni and second and third row transition metals such as, but not exclusively, Ru, Rh, Re, Os, Zr, etc.

In structure (I), YY may have a value of 0, 1, or 2. In embodiments wherein YY has a value of 0, the $R_3$ organic linking moiety is bonded to two X main group elements. In embodiments wherein YY has a value of 1, the $R_3$ organic linking moiety is bonded to three X main group elements. In embodiments wherein YY has a value of 2, the $R_3$ organic linking moiety is bonded to four X main group elements. In preferred embodiments, the value of YY is 0.

In some preferred embodiments, M is bonded to four substituents as shown in Structure (I). In some embodiments, M is a main group element or a transition metal capable of forming a tetravalent coordination sphere. In some embodiments, M is an organic moiety bonded to four substituents. In a preferred embodiment, the value of Y in Structure (I) is 4, and the $R_2$ moiety is not present in the polymer generally depicted by Structure (I). In a preferred embodiment, the value of Z is 2 in Structure (I). In a preferred embodiment, the $R_3$ linking moiety is bonded to two X main group elements, i.e., the value of YY is 0. Such a polymer can be generally depicted by the following structure (IIa):

Structure (IIa)

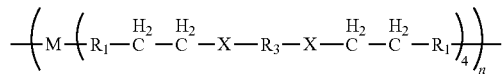

wherein M, $R_1$, X, and $R_3$ are as defined in connection with Structure (I).

In some preferred embodiments, the value of Y is 4, the value of Z is 2, $R_1$ is a direct bond between M and the ethylene group depicted between the M and the X, and the $R_3$ linking moiety is bonded to two X main group elements, i.e., the value of YY is 0. Such a polymer can be generally depicted by the following structure (IIb):

Structure (IIb)

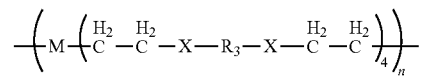

wherein M, X, and $R_3$ are as defined in connection with Structure (I). The polymer having structure (IIb) can be depicted alternatively as Structure (XXV) in which M is depicted in the center of the repeat unit:

Structure (XXV)

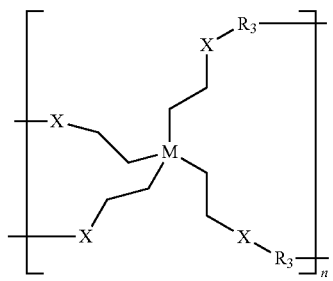

In some preferred embodiments, the value of Y is 4, the value of Z is 2, $R_1$ is a methylene linking group, and the $R_3$ linking moiety is bonded to two X main group elements, i.e., the value of YY is 0. Such a polymer can be generally depicted by the following structure (IIc):

Structure (IIc)

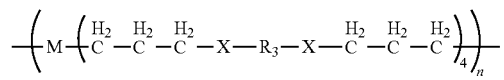

wherein M, X, and $R_3$ are as defined in connection with Structure (I). The polymer having structure (IIC) can be depicted alternatively as Structure (XXVI) in which M is depicted in the center of the repeat unit:

Structure (XXVI)

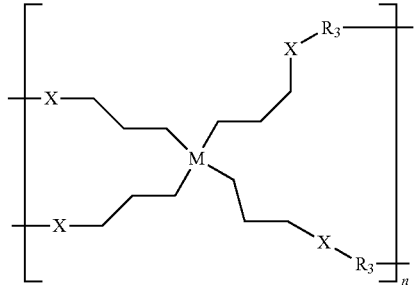

In some preferred embodiments, M is bonded to three substituents as shown in Structure (I). In some embodiments, M is a main group element or a transition metal capable of forming a trivalent coordination sphere. In some embodiments, M is an organic moiety bonded to three substituents. In a preferred embodiment, the value of Y is 4

($R_2$ moiety is not present in the polymer generally depicted by Structure (I)), and the value of Z is 1 in Structure (I). In a preferred embodiment, the $R_3$ linking moiety is bonded to two X main group elements, i.e., the value of YY is 0. Such a polymer can be generally depicted by the following structure (IIIa):

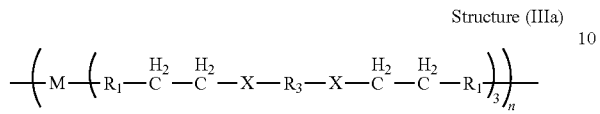

Structure (IIIa)

wherein M, $R_1$, X, and $R_3$ are as defined in connection with Structure (I).

In some preferred embodiments, Y is 4 ($R_2$ moiety is not present in the polymer generally depicted by Structure (I)), Z is 1 in Structure (I), $R_1$ is a direct bond between M and the ethylene group depicted between the M and the X, and the $R_3$ linking moiety is bonded to two X main group elements, i.e., the value of YY is 0. Such a polymer can be generally depicted by the following structure (IIIb):

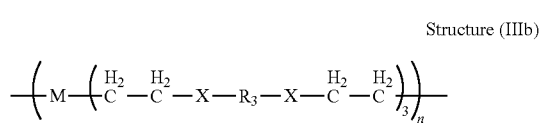

Structure (IIIb)

wherein M, X, and $R_3$ are as defined in connection with Structure (I). The polymer having structure (IIIb) can be depicted alternatively as Structure (XXVII) in which M is depicted in the center of the repeat unit:

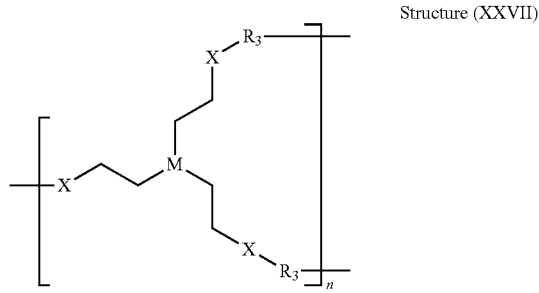

Structure (XXVII)

In some preferred embodiments, Y is 4 ($R_2$ moiety is not present in the polymer generally depicted by Structure (I)), Z is 1 in Structure (I), $R_1$ is a methylene linking group, and the $R_3$ linking moiety is bonded to two X main group elements, i.e., the value of YY is 0. Such a polymer can be generally depicted by the following structure (IIIc):

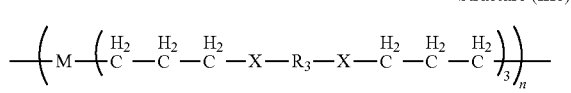

Structure (IIIc)

wherein M, X, and $R_3$ are as defined in connection with Structure (I). The polymer having structure (IIIc) can be depicted alternatively as Structure (XXVIII) in which M is depicted in the center of the repeat unit:

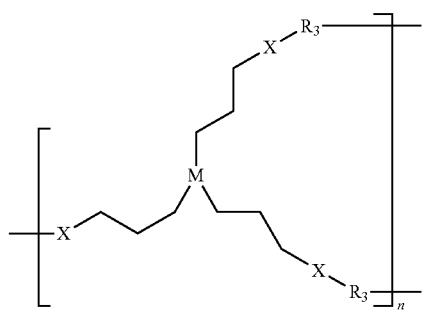

Structure (XXVIII)

In some preferred embodiments, M is Si. The Si atom has a tetravalent coordination sphere. $R_1$ is a direct bond between M and the ethylene group depicted between the M and the X; X is a sulfur atom; and $R_3$ is a hydrocarbyl having from two to five carbon atoms, e.g., a linear chain of 2, 3, 4, or 5-$CH_2$— moieties. This polymer may be depicted below as Structure (IVa):

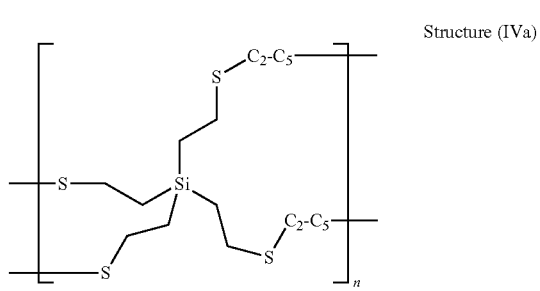

Structure (IVa)

In one preferred embodiment, $R_3$ is a hydrocarbyl having two carbon atoms. In one preferred embodiment, $R_3$ is a hydrocarbyl having five carbon atoms.

In some preferred embodiments, M is Ge. The Ge atom has a tetravalent coordination sphere. $R_1$ is a direct bond between M and the ethylene group depicted between the M and the X; X is a sulfur atom; and $R_3$ is a hydrocarbyl having from two to five carbon atoms, e.g., a linear chain of 2, 3, 4, or 5-$CH_2$— moieties. This polymer may be depicted below as Structure (IVb):

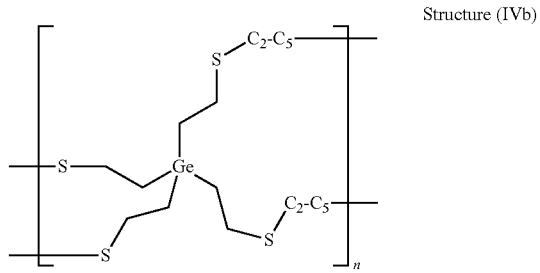

Structure (IVb)

In one preferred embodiment, $R_3$ is a hydrocarbyl having two carbon atoms. In one preferred embodiment, $R_3$ is a hydrocarbyl having five carbon atoms.

In some preferred embodiments, M is Si. The Si atom has a tetravalent coordination sphere. $R_1$ is a direct bond between M and the ethylene group depicted between the M and the X; X is a sulfur atom; and $R_3$ is an aryl group having from 6 to 14 carbon atoms, e.g., phenyl, naphthenyl. This polymer may be depicted below as Structure (IVc):

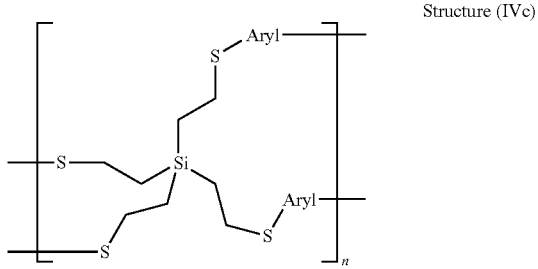

Structure (IVc)

Preferably, $R_3$ is an aryl group having 6 carbon atoms, e.g., phenyl.

In some preferred embodiments, M is Ge. The Ge atom has a tetravalent coordination sphere. $R_1$ is a direct bond between M and the ethylene group depicted between the M and the X; X is a sulfur atom; and $R_3$ is an aryl group having from 6 to 14 carbon atoms, e.g., phenyl, naphthenyl. This polymer may be depicted below as Structure (IVd):

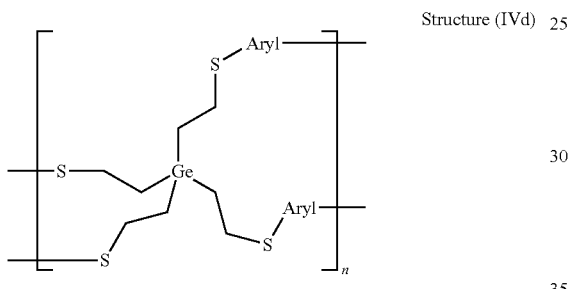

Structure (IVd)

Preferably, $R_3$ is an aryl group having 6 carbon atoms, e.g., phenyl.

In some preferred embodiments, M is Si. The Si atom has a tetravalent coordination sphere. $R_1$ is a methylene linking moiety; X is a sulfur atom; and $R_3$ is a hydrocarbyl having from two to five carbon atoms, e.g., a linear chain of 2, 3, 4, or 5-$CH_2$-moieties. This polymer may be depicted below as Structure (IVe):

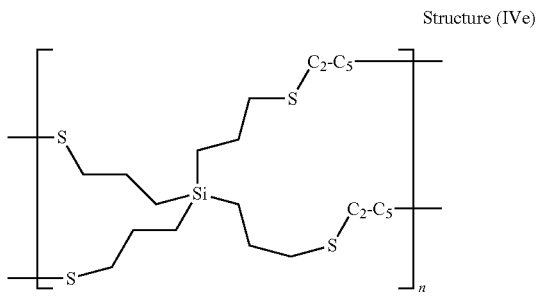

Structure (IVe)

In one preferred embodiment, $R_3$ is a hydrocarbyl having two carbon atoms. In one preferred embodiment, $R_3$ is a hydrocarbyl having five carbon atoms.

In some preferred embodiments, M is Ge. The Ge atom has a tetravalent coordination sphere. $R_1$ is a methylene linking moiety; X is a sulfur atom; and $R_3$ is a hydrocarbyl having from two to five carbon atoms, e.g., a linear chain of 2, 3, 4, or 5-$CH_2$-moieties. This polymer may be depicted below as Structure (IVf):

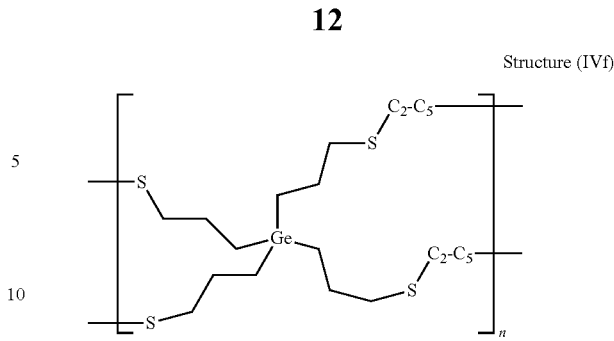

Structure (IVf)

In one preferred embodiment, $R_3$ is a hydrocarbyl having two carbon atoms. In one preferred embodiment, $R_3$ is a hydrocarbyl having five carbon atoms.

In some preferred embodiments, M is Si. The Si atom has a tetravalent coordination sphere. $R_1$ is a methylene linking moiety; X is a sulfur atom; and $R_3$ is an aryl group having from 6 to 14 carbon atoms, e.g., phenyl, naphthenyl. This polymer may be depicted below as Structure (IVg):

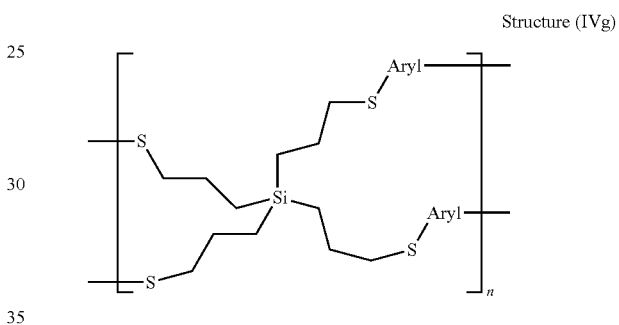

Structure (IVg)

Preferably, $R_3$ is an aryl group having 6 carbon atoms, e.g., phenyl.

In some preferred embodiments, M is Ge. The Ge atom has a tetravalent coordination sphere. $R_1$ is a methylene linking moiety; X is a sulfur atom; and $R_3$ is an aryl group having from 6 to 14 carbon atoms, e.g., phenyl, naphthenyl. This polymer may be depicted below as Structure (IVh):

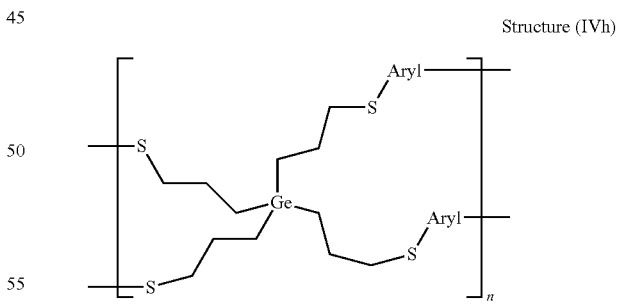

Structure (IVh)

Preferably, $R_3$ is an aryl group having 6 carbon atoms, e.g., phenyl.

In some embodiments, M is an organic moiety comprising three substituent groups; $R_1$ is a direct bond between M and the ethylene group depicted between the M and the X; X is a sulfur atom; and $R_3$ is a hydrocarbyl having from two to five carbon atoms, e.g., a linear chain of 2, 3, 4, or 5-$CH_2$— moieties. This polymer may be depicted below as Structure (IVi):

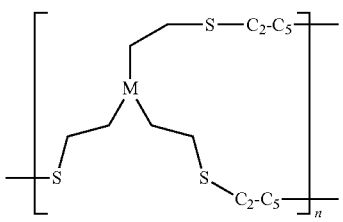

Structure (IVi)

In one preferred embodiment, $R_3$ is a hydrocarbyl having two carbon atoms. In one preferred embodiment, $R_3$ is a hydrocarbyl having five carbon atoms.

In some preferred embodiments, the polymer has the following structure (IVj):

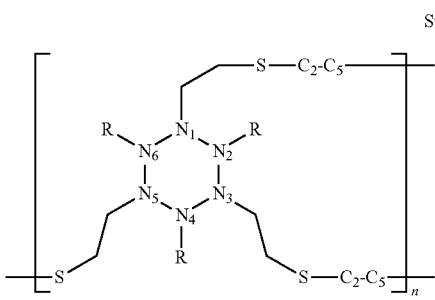

Structure (IVj)

wherein the $N_1$, $N_2$, $N_3$, $N_4$, $N_5$, and $N_6$ may be carbon atoms or they may be heteroatoms selected from among main group elements or transition metal elements, e.g., N, O, S, Se, Sb, P, Ge, Sn, Te, Ga, In, Ni, Co, Ti, Zr, and W. In some embodiments at least three of the $N_1$, $N_2$, $N_3$, $N_4$, $N_5$, and $N_6$ are carbon atoms, and the remaining three or fewer of the $N_1$, $N_2$, $N_3$, $N_4$, $N_5$, and $N_6$ may be a heteroatom, such as N or S. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are nitrogen atoms. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are sulfur atoms. Each R may be hydrogen, a hydrocarbyl having from 1 to 3 carbon atoms or a heteroatom, such as O, N, or S.

In some preferred embodiments, M is an organic moiety comprising three substituent groups; $R_1$ is a methylene linking moiety; X is a sulfur atom; and $R_3$ is a hydrocarbyl having from two to five carbon atoms, e.g., a linear chain of 2, 3, 4, or 5-$CH_2$-moieties. This polymer may be depicted below as Structure (IVk):

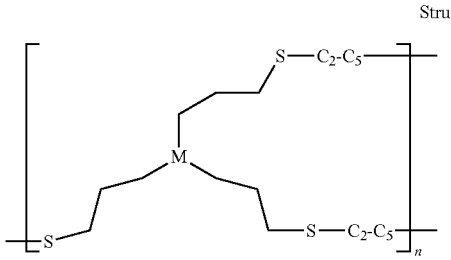

Structure (IVk)

In one preferred embodiment, $R_3$ is a hydrocarbyl having two carbon atoms. In one preferred embodiment, $R_3$ is a hydrocarbyl having five carbon atoms.

In a preferred embodiment, the polymer has the following structure (IVl):

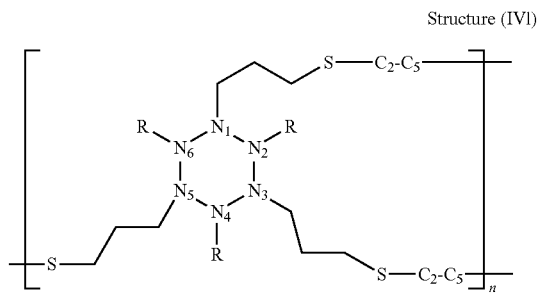

Structure (IVl)

wherein the $N_1$, $N_2$, $N_3$, $N_4$, $N_5$, and $N_6$ may be carbon atoms or they may be heteroatoms selected from among main group elements or transition metal elements, e.g., N, O, S, Se, Sb, P, Ge, Sn, Te, Ga, In, Ni, Co, Ti, Zr, and W. In some embodiments at least three of the $N_1$, $N_2$, $N_3$, $N_4$, $N_5$, and $N_6$ are carbon atoms, and the remaining three or fewer of the $N_1$, $N_2$, $N_3$, $N_4$, $N_5$, and $N_6$ may be a heteroatom, such as N or S. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are nitrogen atoms. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are sulfur atoms. Each R may be hydrogen, a hydrocarbyl having from 1 to 3 carbon atoms or a heteroatom, such as O, N, or S.

In some embodiments, M is an organic moiety comprising three substituent groups; $R_1$ is a direct bond between M and the ethylene group depicted between the M and the X; X is a sulfur atom; and $R_3$ is an aryl group having from 6 to 14 carbon atoms, e.g., phenyl, naphthenyl. This polymer may be depicted below as Structure (IVm):

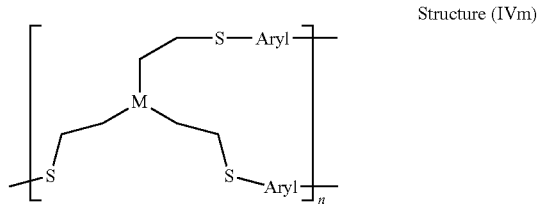

Structure (IVm)

Preferably, $R_3$ is an aryl group having 6 carbon atoms, e.g., phenyl.

In a preferred embodiment, the polymer has the following structure (IVn):

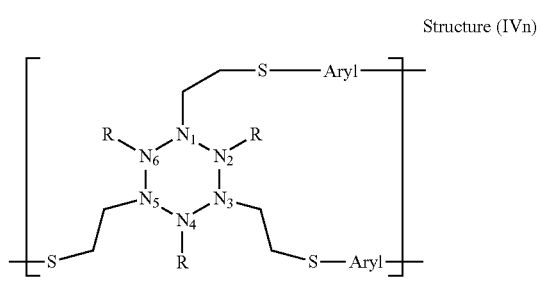

Structure (IVn)

wherein the $N_1$, $N_2$, $N_3$, $N_4$, $N_5$, and $N_6$ may be carbon atoms or they may be heteroatoms selected from among main group elements or transition metal elements, e.g., N, O, S, Se, Sb, P, Ge, Sn, Te, Ga, In, Ni, Co, Ti, Zr, and W. In some embodiments at least three of the $N_1$, $N_2$, $N_3$, $N_4$, $N_5$, and $N_6$ are carbon atoms, and the remaining three or fewer of the $N_1$, $N_2$, $N_3$, $N_4$, $N_5$, and $N_6$ may be a heteroatom, such as N or S. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are nitrogen atoms. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are sulfur atoms. Each R may be hydrogen, a hydrocarbyl having from 1 to 3 carbon atoms or a heteroatom, such as O, N, or S.

In some embodiments, M is an organic moiety comprising three substituent groups; $R_1$ is a methylene linking moiety; X is a sulfur atom; and $R_3$ is an aryl group having from 6 to 14 carbon atoms, e.g., phenyl, naphthenyl. This polymer may be depicted below as Structure (IVo):

Structure (IVo)

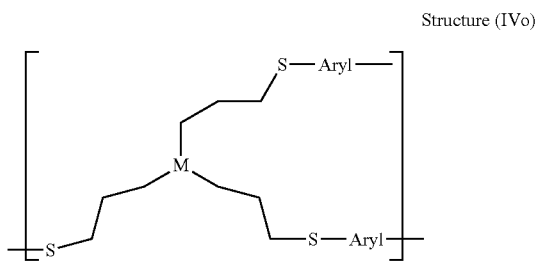

Preferably, $R_3$ is an aryl group having 6 carbon atoms, e.g., phenyl.

In a preferred embodiment, the polymer has the following structure (IVp):

Structure (IVp)

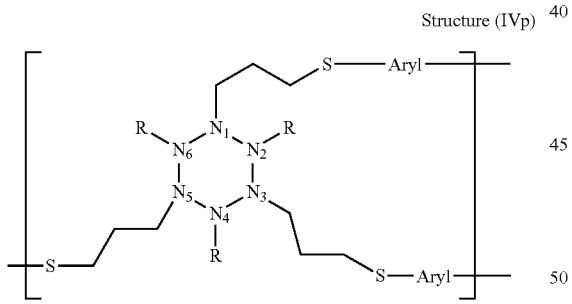

wherein the $N_1$, $N_2$, $N_3$, $N_4$, $N_5$, and $N_6$ may be carbon atoms or they may be heteroatoms selected from among main group elements or transition metal elements, e.g., N, O, S, Se, Sb, P, Ge, Sn, Te, Ga, In, Ni, Co, Ti, Zr, and W. In some embodiments at least three of the $N_1$, $N_2$, $N_3$, $N_4$, $N_5$, and $N_6$ are carbon atoms, and the remaining three or fewer of the $N_1$, $N_2$, $N_3$, $N_4$, $N_5$, and $N_6$ may be a heteroatom, such as N or S. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are nitrogen atoms. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are sulfur atoms. Each R may be hydrogen, a hydrocarbyl having from 1 to 3 carbon atoms or a heteroatom, such as O, N, or S.

In one preferred embodiment, M is derived from 1,3,5-Triallyl-1,3,5-triazine-2,4,6(1H,3H,5H)-trione; $R_1$ is a methylene linking moiety; X is a sulfur atom; and $R_3$ is an aryl group having from 6 carbon atoms. This polymer may be depicted below as Structure (IVq):

Structure (IVq)

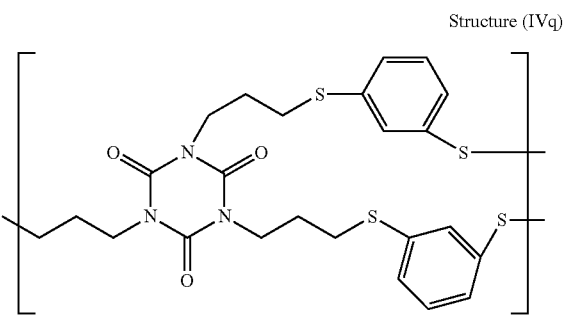

The cross-linked polymers that may be depicted by general structures (I) through (IVq) are obtained by the reaction between a first multifunctional monomer comprising alkenyl groups, e.g., vinyl groups or allyl groups, and a second multifunctional monomer comprising moieties that are reactive with alkenyl groups. The reaction between a multifunctional monomer comprising alkenyl and a multifunctional monomer comprising moieties that are reactive with alkenyl yields a large degree of cross-linking in the resultant, which may impart excellent mechanical properties, such as hardness, fracture resistance, and scratch resistance.

The first multifunctional monomer comprises alkenyl moieties, e.g., vinyl groups or allyl groups. The first multifunctional monomer has the general structure (V):

Structure (V)

In some embodiments, M is a main group element or a transition metal, the main group element or transition metal element being capable of achieving a coordination number of 3, 4, 5, or 6. At least two substituent moieties in the coordination sphere comprise alkenyl groups. In Structure (V), M is a moiety bonded to at least two alkenyl groups, e.g., vinyl groups, allyl groups, and the like, such as between two and six alkenyl groups. In preferred embodiments, M is bonded to three or four substituents comprising alkenyl groups, e.g., three or four vinyl groups or three or four allyl groups.

In some embodiments, in Structure (V), M is a main group element capable of achieving a coordination number of 3 (forming a trivalent coordination sphere). In some embodiments, M is a main group element capable of achieving a coordination number of 4 (forming a tetravalent coordination sphere). The main group element capable of forming a trivalent or tetravalent coordination sphere is a second, third, or fourth row main group element having an electronegativity less than 2.65 (Pauling scale). In some preferred embodiments, the main group elements may be selected from among Si, Ge, or Sn.

In some embodiments, in Structure (V), M is a transition metal element capable of achieving a coordination number of 3 (forming a trivalent coordination sphere). In some embodiments, M is a transition metal element capable of achieving a coordination number of 4 (forming a tetravalent coordination sphere). In some preferred embodiments, the transition metal may be selected from among Mn, Zr, Ti, and Cr.

In some embodiments, M is an organic moiety comprising at least two alkenyl groups, such as two alkenyl, three alkenyl, four alkenyl, five alkenyl, six alkenyl, and preferably three or four alkenyl groups. Herein, organic moiety generally refers to a moiety comprising elements commonly found in biological compounds, such as C, H, O, N, S, and P. In preferred embodiments, the moiety comprises only C, H, O, N, S, or P. However, some moieties that are considered "organic" can additionally comprise additional heteroatoms, such as Se, Sb, P, Ge, Sn, Te, Ga, In, Ni, Co, Ti, Zr, and W. The nomenclature "organic" is used herein to differentiate these types of carbon-based M moieties compared to the M moieties comprising main group elements and transition metal elements. M can be an alkyl, which may be linear, branched or cyclic, having bonded thereto the at least two alkenyl groups. M can be an aromatic group, having bonded thereto the at least two alkenyl groups. The organic moiety may contain one or more heteroatoms selected from the main group of elements including but not exclusively N, O, S, Se, Sb, P, Ge, Sn, Te, Ga, and In. The organic moiety may contain one or more transition element atoms selected from among, but not limited to, Ni, Co, Ti, Zr, and W.

In some embodiments, the organic moiety has the basic ring structure shown below, in which at least two alkenyl groups are bonded thereto. The $N_1$, $N_2$, $N_3$, $N_4$, $N_5$, and $N_6$ may be carbon atoms or they may be heteroatoms selected from among main group elements or transition metal elements, e.g., N, O, S, Se, Sb, P, Ge, Sn, Te, Ga, In, Ni, Co, Ti, Zr, and W. The alkenyl containing moiety may be bonded to a carbon atom on the ring structure of to any of the $N_1$, $N_2$, and $N_3$. The ring structures may be aromatic or non-aromatic.

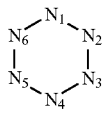

In some embodiments at least three of the $N_1$, $N_2$, $N_3$, $N_4$, $N_5$, and $N_6$ are carbon atoms, and the remaining three or fewer of the $N_1$, $N_2$, $N_3$, $N_4$, $N_5$, and $N_6$ may be a heteroatom, such as N or S. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are nitrogen atoms. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are sulfur atoms. In some preferred embodiments, the organic moiety having any of the above ring structures has one of the following structures:

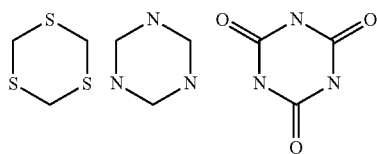

In some embodiments, the organic moiety can be aromatic any may comprise five- and six-member rings, which may be fused or unfused and having bonded thereto substituents comprising the at least two alkenyl groups. Exemplary such aromatic groups include benzene, naphthalene, cyclopentadiene, anthracene, phenanthrene, and 1H-indene. These rings themselves may contain heteroatoms in place of carbon at one or more apexes, the heteroatoms selected from among the main group and transition metals, e.g., N, O, S, Se, Sb, P, Ge, Sn, Te, Ga, In, Ni, Co, Ti, Zr, and W.

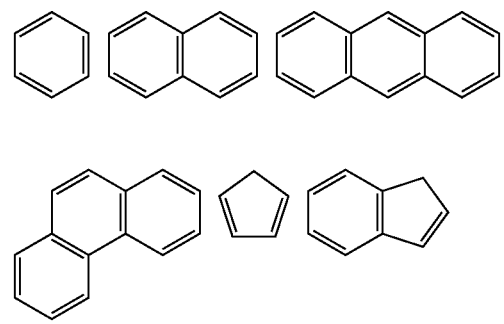

In Structure (V), Y and Z are values that dictate the number of ligands that form a coordination sphere around the central M main group element or transition metal or the number of substituents covalently bonded to the organic M moiety. In Structure (V), Y may be 0, 1, 2, 3 or 4. In Structure (V), Z may be 0, 1, 2, 3, or 4. The values of Y and Z define the number of alkenyl moieties bonded to M. For example, when M is a transition metal or main group element, the values of Y and Z may be such that the total number of moieties bonded to M is 3 (i.e., M forms a trivalent coordination sphere) or 4 (i.e., M forms a tetravalent coordination sphere).

Z may be 0, 1, 2, 3 or 4 such that the first multifunctional monomer comprising alkenyl, e.g., vinyl or allyl, may comprise 2, 3, 4, 5 or 6 alkenyl functional groups. In preferred embodiments, Z is 1 or 2. The alkenyl groups, e.g., vinyl or allyl groups, may be directly bonded to the main group element, the transition metal, or the organic moiety or they may be linked to the main group element or the transition metal via hydrocarbyl having from 1 to about 9 carbons, such as alkyl groups (methylene, ethylene, n-propylene, isopropylene, n-butylene, sec-butylene, isobutylene, tert-butylene, pentylene, neopentylene, hexylenes, heptylenes, octylene, nonylene) or aryl groups (phenyl, benzyl, xylyl, mesityl).

Y may be 0, 1, 2, 3, or 4 such that the first multifunctional monomer may comprise 4, 3, 2, 1 or 0 non-functional moieties, i.e., hydrocarbyl having from 1 to about 9 carbons, such as alkyl groups (methyl, ethyl, n-propyl, isopropyl, n-butyl, sec-butyl, isobutyl, tert-butyl, pentyl, neopentyl, hexyl, heptyl, octyl, nonyl) or aryl groups (phenyl, benzyl, xylyl, mesityl). In the context of the present invention, non-functional moieties such as alkyl groups and aryl groups are non-reactive with the second multifunctional monomer. In preferred embodiments, Y is 4.

In some preferred embodiments, the values of Y and Z are such that the first multifunctional monomer comprising alkenyl, e.g., vinyl or allyl, comprises 3 or 4 ligands or covalently bonded moieties. Combinations within the scope of the present invention include, but are not limited to, four ligands or covalently bonded moieties all of which comprise alkenyl, e.g., four vinyl or allyl moieties; three ligands or covalently bonded moieties comprising alkenyl, e.g., three vinyl or allyl moieties and 0 or 1 moiety not comprising alkenyl; and two ligands or covalently bonded moieties comprising alkenyl, e.g., two vinyl or allyl moieties, and 0, 1, or 2 moieties not comprising alkenyl. The non-functional moieties and linking moieties may be substituted, but are preferably not substituted.

In Structure (V), $R_1$ is, independently of any other $R_1$ in the multifunctional monomer, a direct bond between M and the alkenyl group, e.g., a vinyl group, or a hydrocarbyl linking moiety having between 1 and 9 carbon atoms, e.g., an allyl group. Generally, the two, three, four, five, or six $R_1$ groups are the same. In some preferred embodiments, each $R_1$ group is a direct bond between M and the alkenyl group, such that the alkenyl group is a vinyl group. In some embodiments, each $R_1$ group is a hydrocarbyl linking moiety having between 1 and 4 carbon atoms, such as methylene, ethylene, n-propylene, iso-propylene, n-butylene, iso-butylene, and tert-butylene. In some preferred embodiments, $R_1$ is methylene, such that the alkenyl group is an allyl group.

In Structure (V), $R_2$ is, independently of any other $R_2$ in the multifunctional monomer, a hydrocarbyl moiety having between 1 and about 9 carbon atoms. In general, if two $R_2$ groups are present in the multifunctional monomer whose structure is generally depicted as structure (II), they are the same. Preferably, the multifunctional monomer whose structure is generally depicted as structure (II) does not comprise any $R_2$ groups.

In some preferred embodiments, the value of Y is 4, and the value of Z is 2 in Structure (V). That is, the first multifunctional monomer comprising alkenyl, e.g., vinyl or allyl groups, having the general structure (V) comprises no $R_2$ groups and comprises 4 ligands or covalently bonded moieties comprising alkenyl, e.g., vinyl or allyl groups. Such a first multifunctional monomer has the following general structure (VIa):

Structure (VIa)

wherein M and $R_1$ are as defined above in connection with Structure (V).

In some preferred embodiments, the value of Y is 4, and the value of Z is 1 in Structure (V). That is, the first multifunctional monomer comprising alkenyl moieties, e.g., vinyl groups, allyl groups and the like having the general structure (V) comprises no $R_2$ groups and comprises three ligands or covalently bonded moieties comprising alkenyl groups, e.g., vinyl or allyl. Such a first multifunctional monomer has the following general structure (VIb):

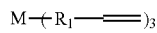

Structure (VIb)

wherein M and $R_1$ are as defined above in connection with Structure (V).

In some preferred embodiments, the first multifunctional monomer of Structure (VIb) comprises an organic moiety and has the following general structure (VIc):

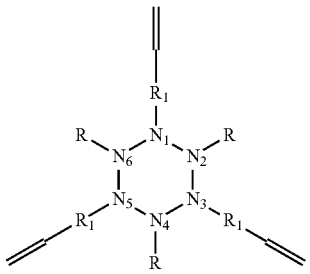

Structure (VIc)

wherein $R_1$ are as defined above in connection with Structure (V), the $N_1$, $N_2$, $N_3$, $N_4$, $N_5$, and $N_6$ may be carbon atoms or they may be heteroatoms selected from among main group elements or transition metal elements, e.g., N, O, S, Se, Sb, P, Ge, Sn, Te, Ga, In, Ni, Co, Ti, Zr, and W. In some embodiments at least three of the $N_1$, $N_2$, $N_3$, $N_4$, $N_5$, and $N_6$ are carbon atoms, and the remaining three or fewer of the $N_1$, $N_2$, $N_3$, $N_4$, $N_5$, and $N_6$ may be a heteroatom, such as N or S. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are nitrogen atoms. In some preferred embodiments, three of the $N_1$, $N_2$, $N_3$, $N_4$, $N_5$, and $N_6$ are carbon atoms and the remaining three of the $N_1$, $N_2$, $N_3$, $N_4$, $N_5$, and $N_6$ are sulfur atoms. Each R may be hydrogen, a hydrocarbyl having from 1 to 3 carbon atoms or a heteroatom, such as O, N, or S.

In preferred embodiments, the non-functional moieties and linking moieties are not substituted with any moiety comprising an atom having an electronegativity greater than 2.65 (Pauling scale) such as oxygen, nitrogen, fluorine, chlorine, and the like, although such atoms are not excluded from the first multifunctional monomer.

In some embodiments, the value of Y is 4, $R_1$ is a direct bond between M and a vinyl group, and the value of Z is 2 in the first multifunctional monomer of general structure (V). Such a monomer has the general structure (VII):

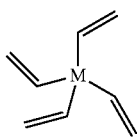

Structure (VII)

wherein M is defined above in connection with Structure (V).

In some embodiments, the value of Y is 4, $R_1$ is a direct bond between M and a vinyl group, and the value of Z is 1 in the first multifunctional monomer of general structure (V). Such a monomer has the general structure (VIII):

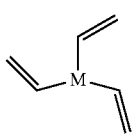

Structure (VIII)

wherein M is defined above in connection with Structure (V).

In some embodiments, the value of Y is 3, $R_1$ is a direct bond between M and a vinyl group, and the value of Z is 1 in the first multifunctional monomer of general structure (V). Such a monomer has the general structure (IX):

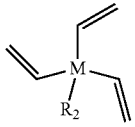

Structure (IX)

wherein M and $R_2$ are defined above in connection with Structure (V).

In some embodiments, the value of Y is 2, $R_1$ is a direct bond between M and the vinyl group, and the value of Z is 0 in the first multifunctional monomer of general structure (V). Such a monomer has the general structure (X):

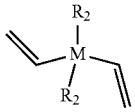

Structure (X)

wherein M and $R_2$ are defined above in connection with Structure (V).

In a preferred embodiment, the first multifunctional monomer is that of general structure (VII), and M is Si. Herein, the first multifunctional monomer comprises four vinyl groups directly bonded to Si. This first multifunctional monomer, tetravinylsilane, has the following structure (XI):

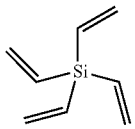

Structure (XI)

In a preferred embodiment, the first multifunctional monomer is that of general structure (VII), and M is Ge. Herein, the first multifunctional monomer comprises four vinyl groups directly bonded to Ge. This first multifunctional monomer, tetravinylgermane, has the following structure (XII):

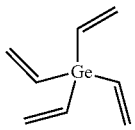

Structure (XII)

In some preferred embodiments, M may be the cyclic structure of triethenyl. For example, in a preferred embodiment, the first multifunctional monomer is that of general structure (VIII), and M is 1,3,5-triazinane-2,4,6-trione. The vinyl groups are bonded to each nitrogen atom. This first multifunctional monomer, 1,3,5-trivinyl-1,3,5-triazinane-2,4,6-trione, has the following structure (XIII):

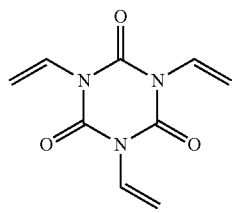

Structure (XIII)

In another embodiment wherein M is the cyclic structure of triethenyl, the multifunctional monomer is 2,4,6-trivinyl-1,3,5-trithiane, having the following structure (XIV):

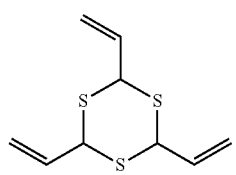

Structure (XIV)

In some embodiments, the value of Y is 4, $R_1$ is a methylene linking group between M and the vinyl group (i.e., is an allyl moiety), and the value of Z is 2 in the first multifunctional monomer comprising vinyl of general structure (V). Such a monomer has the general structure (XV):

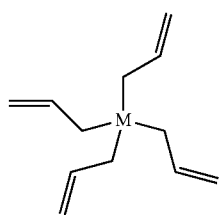

Structure (XV)

wherein M is defined above in connection with Structure (V).

In some embodiments, the value of Y is 4, $R_1$ is a methylene linking group between M and the vinyl group (i.e., is an allyl moiety), and the value of Z is 1 in the first multifunctional monomer comprising vinyl of general structure (V). Such a monomer has the general structure (XVI):

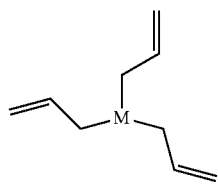

Structure (XVI)

wherein M is defined above in connection with Structure (V).

In some embodiments, the value of Y is 3, $R_1$ is a methylene linking group between M and the vinyl group (i.e., is an allyl moiety), and the value of Z is 1 in the first multifunctional monomer comprising vinyl of general structure (V). Such a monomer has the general structure (XVII):

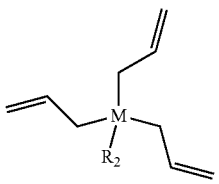

Structure (XVII)

wherein M and $R_2$ are defined above in connection with Structure (V).

In some embodiments, the value of Y is 2, $R_1$ is a methylene linking group between M and the vinyl group (i.e., is an allyl moiety), and the value of Z is 0 in the first multifunctional monomer comprising vinyl of general structure (V). Such a monomer has the general structure (XVIII):

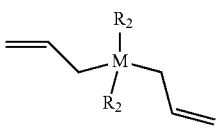

Structure (XVIII)

wherein M and $R_2$ are defined above in connection with Structure (V).

In a preferred embodiment, the first multifunctional monomer comprising vinyl is that of general structure (XV), and M is Si. Herein, the first multifunctional monomer comprising vinyl comprises four vinyl groups bonded to Si via a linking methylene group, i.e., is an allyl moiety. This first multifunctional monomer, tetraallylsilane, has the following structure (XIX):

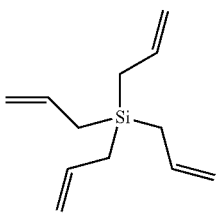

Structure (XIX)

In a preferred embodiment, the first multifunctional monomer comprising vinyl is that of general structure (XV), and M is Ge. Herein, the first multifunctional monomer comprising vinyl comprises four vinyl groups bonded to Ge via a linking methylene group, i.e., is an allyl moiety. This first multifunctional monomer, tetraallylgermane, has the following structure (XX):

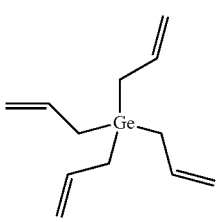

Structure (XX)

In a preferred embodiment, the first multifunctional monomer is that of general structure (VIII), and M is 1,3,5-triazinane-2,4,6-trione. Herein, the first multifunctional monomer comprises four vinyl groups bonded to 1,3,5-triazinane-2,4,6-trione via a linking methylene group, i.e., is an allyl moiety. This first multifunctional monomer, 1,3,5-triallyl-1,3,5-triazinane-2,4,6-trione, has the following structure (XXI):

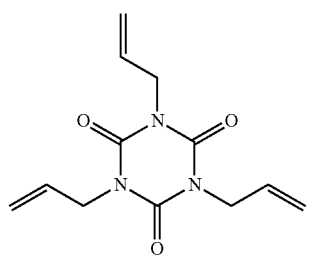

Structure (XXI)

In another embodiment wherein M is the cyclic structure of triethenyl and further comprising a methylene linking moiety, the multifunctional monomer is 2,4,6-triallyl-1,3,5-trithiane, having the following structure (XXII):

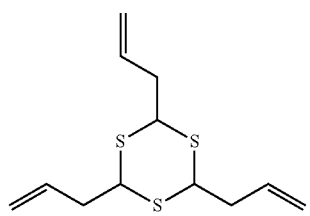

Structure (XXII)

The second multifunctional monomer comprises moieties that are reactive with vinyl. In order to achieve a high degree of cross-linking, the second multifunctional monomer comprises at least two moieties that are reactive with alkenyl such as two, three, four or more reactive moieties. Reactive moieties include any element whose functional group —XH undergoes a cross-linking reaction with vinyl. In general, the second multifunctional monomer comprising multiple reactive moieties links the reactive moieties through a hydrocarbyl linking group, e.g., alkyl, alkenyl, alkynyl, or aryl that may or may not be substituted, e.g., with a heteroatom. Preferably, the second multifunctional monomer is such that atoms having an electronegativity greater than 2.65 (Pauling scale) such as oxygen, nitrogen, fluorine, chlorine, and the like is limited. Even more preferably, atoms having an electronegativity greater than 2.65 (Pauling scale) such as oxygen, nitrogen, fluorine, chlorine, and the like are excluded from the second multifunctional monomer.

In some embodiments, a second multifunctional monomer comprising moieties reactive with vinyl groups may have the general structure (XXIII):

$R_3$—(XH)$_{2+YY}$   Structure (XXIII)

In Structure (XXIII), X is an element whose functional group —XH is reactive with vinyl groups. X may be a main group element selected from among S, P, As, Se, Te, and Sb. In some preferred embodiments, X is selected from among S, Se, or Te. In some preferred embodiments, X is S, and the polymer of the present invention is prepared by thiol-ene coupling.

In Structure (XXIII), YY is an integer having a value of 0, 1, or 2. The equation 2+YY defines the number of —XH reactive moieties bonded to the $R_3$ organic linking groups. In some preferred embodiments, YY is 0, such that the second multifunctional monomer comprises two —XH reactive moieties.

In Structure (XXIII), $R_3$ is an organic linking group that links the —XH reactive groups. $R_3$ may be alkyl, substituted alkyl, alkenyl, substituted alkenyl, alkynyl, substituted alkynyl, aryl, or substituted aryl. Alkyl $R_3$ linking groups generally have between 1 and about 10 carbon atoms, preferably between 1 and 5 carbon atoms. With regard to alkenyl, alkynyl, and aryl linking groups, the number of carbon atoms may be greater, such as between 2 and about 24 carbon atoms, preferably between 2 and about 20 carbon atoms, more preferably between 2 and about 12 carbon atoms. The use of alkenyl, alkynyl, and aryl linking groups is particularly advantageous since these linking groups incorporate unsaturated bonds into to the cross-linked polymer, which has been found to increase the refractive index of the resultant material. This effect is particularly achieved when the linking group incorporates conjugated double and triple bonds into the resultant material Linking groups comprising conjugated doubled and triple bonds include alkenyl, alkynyl, or aryl in which the number of conjugated double bonds is between 2 and about 10, preferably between 2 and about 5. A high number of conjugated double bonds and aromatic groups may result in a less rigid polymer and may also result in the material becoming colored, which is disadvantageous for applications such as corrective lenses.

In some embodiments, $R_3$ is an organic linking group that may be an alkyl, substituted alkyl, alkenyl, substituted alkenyl, alkynyl, substituted alkynyl, aryl, or substituted aryl further comprising a hetero atom, preferably a main group element selected from the group consisting of S, P, As, Se, Ge, Sn, In, Sb, Te.

In some embodiments, $R_3$ is an organic linking group that may be an alkyl, substituted alkyl, alkenyl, substituted alkenyl, alkynyl, substituted alkynyl, aryl, or substituted aryl further comprising a hetero atom, preferably a transition metal element selected from the group consisting of Mn, Fe Co, Ni and second and third row transition metals such as, but not exclusively, Ru, Rh, Re, Os, Zr etc.

The structures of several $R_3$ groups containing no heteroatoms are as follows:

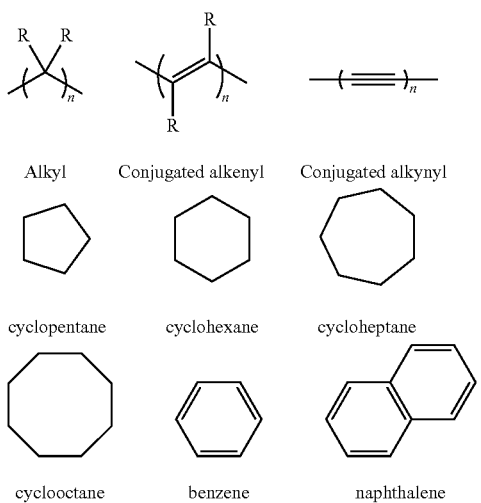

Alkyl    Conjugated alkenyl    Conjugated alkynyl cyclopentane    cyclohexane    cycloheptane cyclooctane    benzene    naphthalene

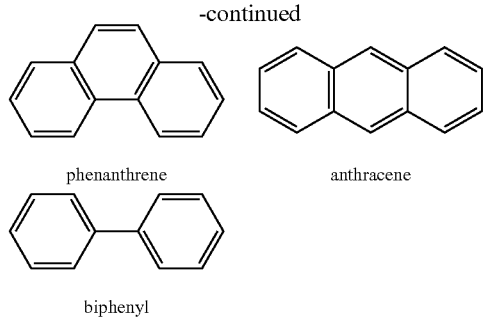

phenanthrene    anthracene biphenyl

The $R_3$ group may include heteroatoms of main group elements and transition metal elements. Inclusion of such heteroatoms in the $R_3$ group that may further enhance the refractive index.

Representative examples of $R_3$ linking groups containing heteroatoms are shown below include two coordinate structures where M' are main group elements, typically, but not exclusively S, Se, Te. The structures can be linear or ring structures, saturated or unsaturated, containing one or more of the elements M', where M' may be all the same element or a mixture of elements. Exemplary such $R_3$ groups containing M' heteroatoms may have the general structure shown below:

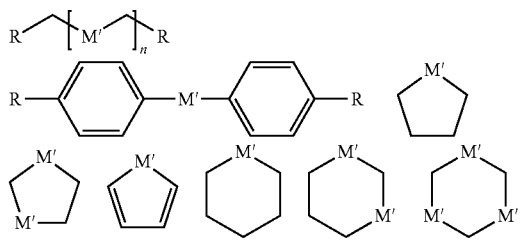

$R_3$ can contain three coordinate structures with M" being from the main group, primarily but not exclusively P, As, Sb, Bi. Exemplary such $R_3$ groups containing M" heteroatoms are shown below:

$R_3$ can contain four-coordinate structures where M'" is a main group element including, but not limited to Si, Ge, Sn or transition metals such as, but not limited to Co, Ni, Fe. Exemplary such $R_3$ groups containing M'" heteroatoms are shown below:

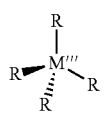

$R_3$ can contain 6 coordinate structures where M"" can be a transition metal including but not limited to Mo, Ru, Fe, or Re. Exemplary such $R_3$ groups containing M"" heteroatoms are shown below:

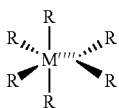

In each of the general $R_3$ linking groups structures, n is between 1 and about 10. In each of the above exemplary $R_3$ linking groups structures, the R groups are hydrocarbyl substituents having from 1 to about 8 carbon atoms, preferably 1 to 3 carbon atoms, or hydrogen.

Each of the $R_3$ linking groups may be substituted with moieties comprising heteroatoms. Preferably, any such substituents have a limited proportion of atoms having an electronegativity greater than 2.65 (Pauling scale) such as oxygen, nitrogen, fluorine, chlorine, and the like. Even more preferably, the substituents lack atoms having an electronegativity greater than 2.65 (Pauling scale) such as oxygen, nitrogen, fluorine, chlorine, and the like.

In one preferred embodiment, the second multifunctional monomer comprising moieties reactive with vinyl groups is difunctional, i.e., YY is 0 and the second multifunction monomer comprises two moieties reactive with vinyl groups. A difunctional monomer comprising two reactive moieties may have the general structure (XXIV):

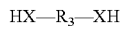

Structure (XXIV)

In structure (XXIV), $R_3$ and X are as defined above in connection with general structure (XXIII).

Exemplary second multifunctional monomers in which X is sulfur atom, include, for example, ethane-1,2-dithiol; propane-1,2-dithiol; propane-1,3-dithiol; butane-1,2-dithiol; butane-1,3-dithiol; butane-2,3-dithiol; butane-1,4-dithiol; pentane-1,3-dithiol, pentane-1,4-dithiol, pentane-1,5-dithiol, pentane-2,3-dithiol, and pentane-2,4-dithiol; hexane-1,6-dithiol and other hexanedithiols; heptane-1,7-dithiol and other heptanedithiols; octane-1,8-dithiol and other octanedithiols; 2,2'-oxydiethanethiol; 3,6-dioxa-1,8-octanedithiol; ethylene glycol bisthiol-glycolate; dl-1,4-dithiothreitol; 2,2'-thiodiethanethiol; bis(2-mercaptoethyl)sulphone; 2,5-dimercapto-1,3,4-thiadiazole; 5-({2-[(5-mercapto-1,3,4-thiadiazol-2-yl)thio]ethyl}thio)-1,3,4-thiadiazole-2-thiol; pentaerythritol tetra(2-mercaptoacetate); trimethylolpropane tris(3-mercaptopropionate); trimethylolpropane tris(2-mercaptoacetate); benzene-1,2-dithiol; benzene-1,3-dithiol; benzene-1,4-dithiol; 3,4-dimercaptotoluene; 1,4-benzenedimethanethiol; 1,3-benzenedimethanethiol; 1,6-di(methanethiol)-3,4-dimethyl-phenyl; [3-(mercaptomethyl)-2,4,6-trimethylphenyl]methanethiol; 1,5-dimercaptonaphthalene; 3,3'-thiobis[2-[(2-mercaptoethyl)thio]-1-propanethiol; 5-[3-(5-mercapto-1,3,4-oxadiazole-2-yl)propyl]-1,3,4-oxadiazole-2-thiol; 1,3,5-triazine-2,4,6(1H, 3H,5H)-trithione; and 2,3-bis[(2-mercaptoethyl)thio]-1-propanethiol.

In one preferred embodiment, X is S, and $R_3$ is an ethyl group, and the multifunctional monomer comprising moieties reactive with vinyl groups is a difunctional molecule. Such a monomer is ethane-1,2-dithiol.

In one preferred embodiment, X is S, and $R_3$ is a pentyl group, and the multifunctional monomer comprising moieties reactive with vinyl groups is a difunctional molecule. Such monomers include pentane-1,3-dithiol, pentane-1,4-dithiol, pentane-1,5-dithiol, pentane-2,3-dithiol, and pentane-2,4-dithiol. A preferred monomer is pentane-1,5-dithiol.

In one preferred embodiment, X is S, and $R_3$ is a phenyl group, and the monomer is a difunctional monomer. Such monomers include benzene-1,2-dithiol, benzene-1,3-dithiol, and benzene-1,4-dithiol. A preferred monomer is benzene-1,3-dithiol.

The present invention is additionally directed to a method of forming a high refractive index material comprising a polymer having a high degree of cross-linking and containing polarizable elements.

In some embodiments, the method of the present invention comprises contacting the first multifunctional monomer comprising vinyl groups having general structure (V):

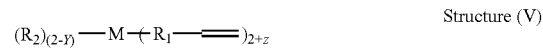

Structure (V)

wherein M, Y, Z, $R_1$, and $R_2$ are as defined above in connection with Structure (V);

with a second multifunctional monomer comprising groups that are reactive with vinyl groups having general structure (XXIII):

Structure (XXIII)

wherein X, $R_3$, and YY are as defined above in connection with Structure (XXIII);

to yield a cross-linked polymer having general structure (I):

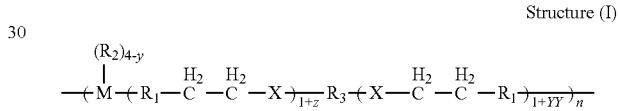

Structure (I)

wherein M, X, $R_1$, $R_2$, $R_3$, Y, Z, and YY are as defined above in connection with Structures (I), (V), and (XXIII).

In one embodiment, the present invention is directed to a method of forming a high refractive index material comprising a polymer having a high degree of cross-linking and comprising polarizable elements, which comprises reacting the first multifunctional monomer comprising vinyl groups having general structure (VIa):

Structure (VIa)

wherein M and $R_1$ are as defined above in connection with Structure (V);

with a second multifunctional monomer comprising groups that are reactive with vinyl groups having general structure (XXIV):

Structure (XXIV)

wherein X and, $R_3$ are as defined above in connection with Structure (XXIII);

to yield the cross-linked inorganic/organic hybrid polymer having general structure (IIa):

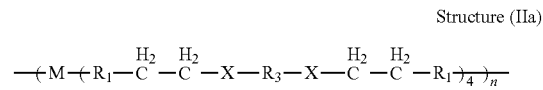

Structure (IIa)

wherein M, X, $R_1$, and $R_3$ are as defined above in connection with Structures (I), (V), and (XXIII).

In one embodiment, the present invention is directed to a method of forming a high refractive index material comprising a polymer having a high degree of cross-linking and comprising polarizable elements, which comprises reacting the first multifunctional monomer comprising vinyl groups having general structure (VIb):

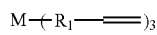   Structure (VIb)

wherein M and $R_1$ are as defined above in connection with Structure (V);

with a second multifunctional monomer comprising groups that are reactive with vinyl groups having general structure (XXIV):

HX—$R_3$—XH    Structure (XXIV)

wherein X and, $R_3$ are as defined above in connection with Structure (XXIII);

to yield the cross-linked inorganic/organic hybrid polymer having general structure (IIIa):

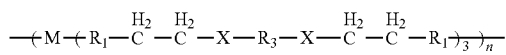   Structure (IIIa)

wherein M, X, $R_1$, and $R_3$ are as defined above in connection with Structures (I), (V), and (XXIII).

In a preferred embodiment, the first multifunctional monomer of structure (VII) is reacted with the second multifunctional monomer comprising two vinyl-reactive groups reactive of structure (XXIV) according to reaction (A) below, which yields a highly cross-linked polymer having general structure (XXV) as shown:

Reaction (A)

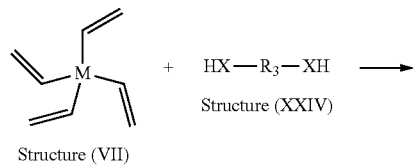

Structure (VII)        Structure (XXIV)

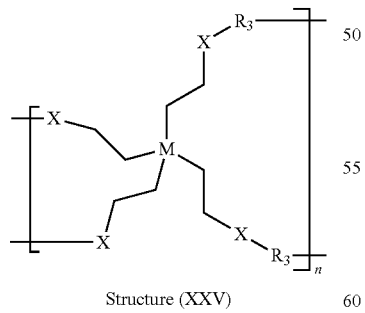

Structure (XXV)

wherein M, X, and $R_3$ are as defined in Structures (V) and (XXIV).

In one preferred embodiment, tetravinylsilane is reacted with ethane-1,2-dithiol to form the highly crosslinked polymer as shown in reaction (B):

Reaction (B)

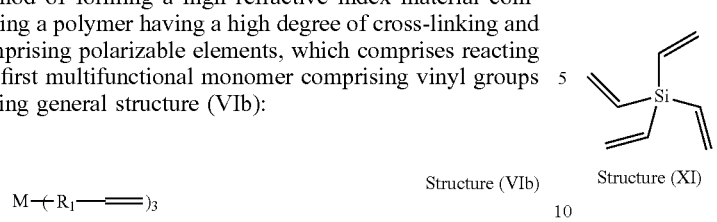

Structure (XI)

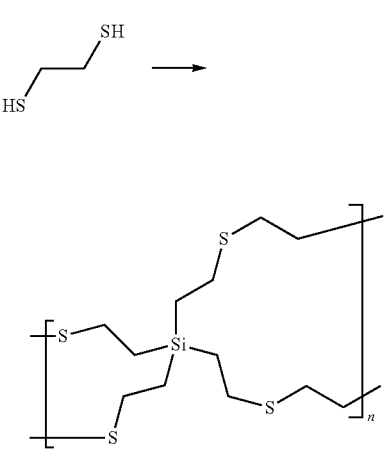

In a preferred embodiment, the first multifunctional monomer of structure (XV) is reacted with the second multifunctional monomer comprising two vinyl-reactive groups reactive of structure (XXIV) according to reaction (C) below, which yields a highly cross-linked polymer having general structure (XXVI) as shown:

Reaction (C)

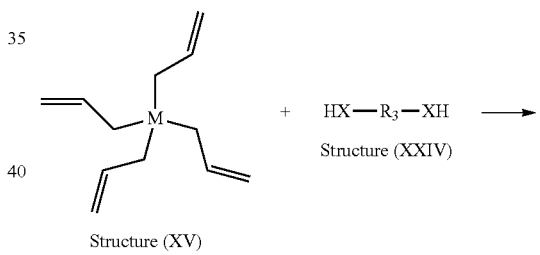

Structure (XV)        Structure (XXIV)

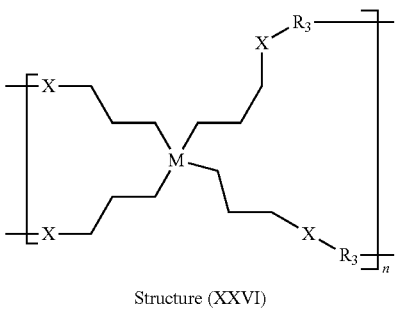

Structure (XXVI)

wherein M, X, and $R_3$ are as defined in Structures (V) and (XXIV).

In a preferred embodiment, the first multifunctional monomer of structure (VIII) is reacted with the second multifunctional monomer comprising two vinyl-reactive groups reactive of structure (XXIV) according to reaction (D) below, which yields a highly cross-linked polymer having general structure (XXVII) as shown:

Reaction (D)

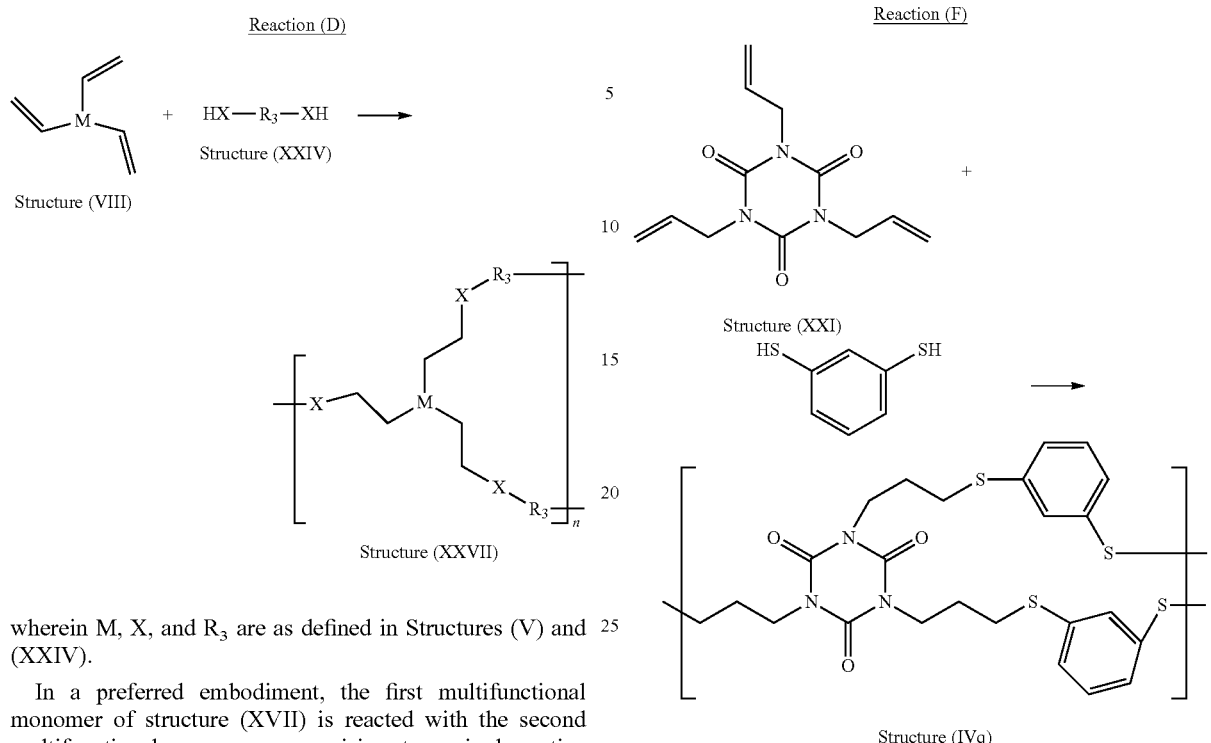

wherein M, X, and R₃ are as defined in Structures (V) and (XXIV).

In a preferred embodiment, the first multifunctional monomer of structure (XVII) is reacted with the second multifunctional monomer comprising two vinyl-reactive groups reactive of structure (XXIV) according to reaction (E) below, which yields a highly cross-linked polymer having general structure (XXXVIII) as shown:

Reaction (E)

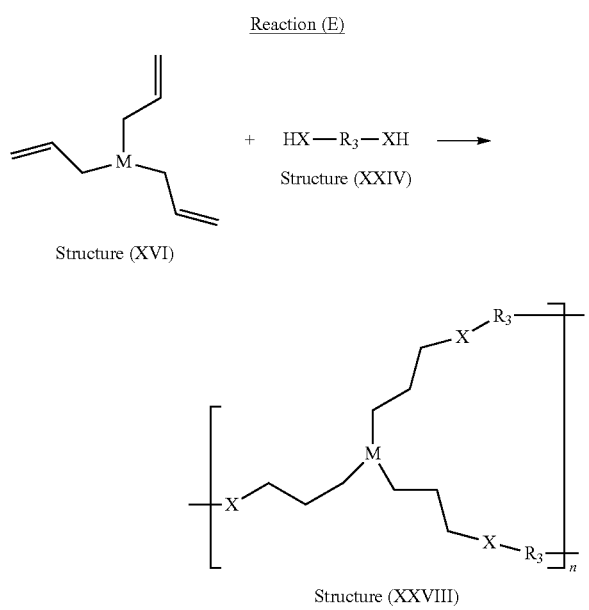

wherein M, X, and R₃ are as defined in Structures (V) and (XXIV).

In one preferred embodiment, 1,3,5-Triallyl-1,3,5-triazine-2,4,6(1H,3H,5H)-trione is reacted with benzene-1,3-dithiol to form the highly crosslinked polymer having structure (IVq) as shown in reaction (F):

Other preferred reactants and polymers of the present invention are shown in the below examples.

The reaction mixture may be prepared by combining the first multifunctional monomer comprising alkenyl groups with the second multifunctional monomer comprising moieties that are reactive with alkenyl groups. In general, solvent is not necessary since the second monomer is generally a liquid at room temperature. In some embodiments, the relative concentrations of the first and second monomers are such that the functional groups are present in substantially equal molar amounts. For example, a reaction mixture comprising a first multifunctional monomer comprising four vinyl groups and a second multifunctional monomer comprising two functional groups that react with vinyl preferably contains a molar ratio of the second multifunctional monomer to the first multifunctional monomer of approximately 2:1, so that the molar ratio of the functional groups are stoichiometrically balanced. In general, an excess of the second multifunctional monomer is acceptable to ensure complete reaction of the vinyl groups. Non-reacted alkenyl groups are generally undesirable since such alkenyl groups may cause the cross-linked polymer to yellow over time.

In some embodiments, the reaction forms a prepolymer gel by contacting the reactants at room temperature. In some embodiments, the gel is cured by transferring the gel to a mold of desired dimension and then cured in an oven between about 120° C. and about 200° C. for a duration sufficient to achieve the desired cure, typically over several hours, such as at least 10 hours, at least 15 hours, or even at least 20 hours. In general, the cure temperature affects the hardness of the final material, with cures at 120° C. resulting in a softer material and cures between about 150° C. and about 200° C. resulting in a harder material. The curing temperature may depend upon the materials themselves, as some material may discolor at higher cure temperatures. In some embodiments, the thermal processing alone is sufficient.

In some embodiments, the polymerization and cross-linking reaction may be catalyzed by heat, radiation, or a combination of the two. Cross-linking occurs either through a photochemical process utilizing UV radiation and further curing to complete the process is often performed thermally. In some embodiments, the preparation is carried out in two steps to achieve maximum cross-linking In the two-step photochemical/heating process, the first reaction is photochemical. The reaction mixture is thoroughly degassed to remove oxygen and placed in a seal quartz container. The reaction mixture may then be irradiated broadband (unfiltered) with a 250 Watt high pressure mercury arc lamp for a period of approximately 1 hour per 5 grams of solution. The irradiation duration typically varies proportionally with the amount of materials present. This results in a partially cross-linked pre-polymer gel. In this state, the polymer chains have reached such a length that the material is viscous, but pourable. In some embodiments, the gel is cured by transferring the gel to a mold of desired dimension and then cured in an oven between about 120° C. and about 200° C. for a duration sufficient to achieve the desired cure, typically many hours, such as at least 10 hours, at least 15 hours, or even at least 20 hours. In general, the cure temperature affects the hardness of the final material, with cures at 120° C. resulting in a softer material and cures between about 150° C. and about 200° C. resulting in a harder material. The curing temperature may depend upon the materials themselves, as some material may discolor at higher cure temperatures.

In general, at least about 70% of the functional groups, i.e., alkenyl groups and —XH moieties in the reaction mixture have reacted in the resultant highly cross-linked polymer, preferably at least 80% of the functional groups have reacted, and even more preferably at least 90% of the functional groups have reacted. Thus, the reaction comprises a self-initiated polymerization step that forms a prepolymer gel, and a step in which the prepolymer gel is cured to yield the product of any of structures I, IIa, Ma, IVc, IVe, IVg, IVj, IVl, IVp, and IVq wherein at least about 90% of the R1, R2, and (XH) moieties of the multifunctional monomers groups have reacted.

Since the polymers of the present invention are highly cross-linked, the polymers of the present invention form a three-dimensional bulk material. In view thereof, the average molecular weight of the polymer is very difficult or may even be impossible to determine. Based on current understandings, it is thought that average molecular weights tend to be very high, such as at least 20,000 g/mol, at least 50,000 g/mol, at least 100,000 g/mol, at least 1,000,000 g/mol, or even at least 10,000,000 g/mol.

Preferably, the high refractive index polymers produced by the process of the present invention contain hydrocarbon and second row or greater main group elements, such as Si, Ge, or Sn. These second row or greater main group elements have high polarizabilities, which yield high refractive index. In preferred embodiments, the polymer of the present invention lacks electronegative atoms such as N and O, which are often found in polymethracrylates, polycarbonates and polythiourethanes, and which tend to yield lower refractive index materials. In some embodiments, the materials are highly cross-linked which will yield very hard, fracture, and scratch resistant materials. The polymers of the present invention also can be fabricated with out optical chromophores that give rise to absorption in the visible region of the spectrum, such that the materials are therefore transparent.

Having described the invention in detail, it will be apparent that modifications and variations are possible without departing from the scope of the invention defined in the appended claims.

EXAMPLES

The following non-limiting examples are provided to further illustrate the present invention.

Fabrication of polymers according to the present invention was carried out by combining various vinyl monomers (such as tetravinylsilane, 1,3,5-Triallyl-1,3,5-triazine-2,4,6 (1H,3H,5H)-trione, tetra-allylsilane, and tetra-allylgermane) and thiol monomers (such as ethane-1,2-dithiol, pentane-1, 5-dithiol and benzene-1,3-dithiol). The experimental details for each combination and physical properties of the resulting polymers have been described in the following examples:

Example 1. Preparation of a High Refractive Index Polymer

Fabrication of a polymer according to the present invention was carried out by reacting tetravinylsilane and ethane-1,2-dithiol according to the following reaction sequence:

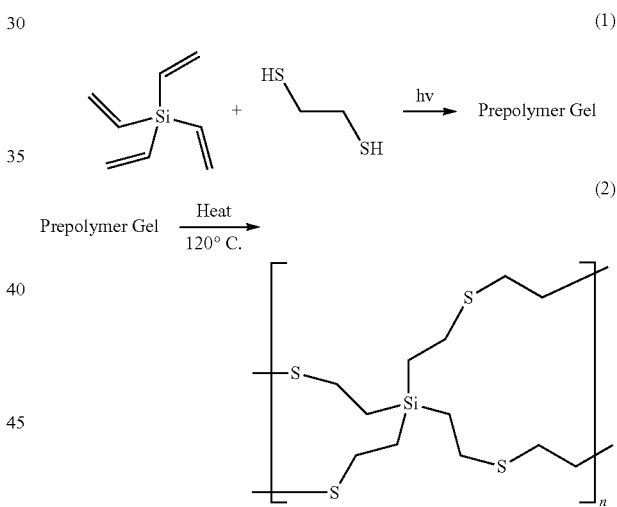

The reaction mixture was prepared by combining ethane-1,2-dithiol and tetravinylsilane in a molar ratio of 2 moles ethane-1,2-dithiol:1 mole tetravinylsilane. To prepare the reaction mixture, ethane-1,2-dithiol (2.8 grams) was homogeneously mixed with of tetravinylsilane (2.0375 g) in a quartz container. The reaction mixture was thoroughly degassed by passing nitrogen gas, bubble by bubble, through the reaction mixture for about 10 minutes to remove oxygen. The quartz container was then sealed.

The reaction mixture (4.8375 g) was then subjected to photochemical curing by irradiating it with a 250 Watt high pressure mercury-xenon arc lamp for one hour. Irradiation resulted in a partially cross-linked pre-polymer gel. The gel was transferred to a mold of desired dimension and then cured in an oven at 120° C. for a period of 24 hours.

The resulting cross-linked polymer was transparent, colorless, and hard. Measurement of the optical and selected physical properties of the polymer prepared by thiol-ene coupling ethane-1,2-dithiol and tetravinylsilane is given in Table 1.

TABLE 1

Physical Properties of the Polymer

| Measurement | Value |
| --- | --- |
| Specific Gravity | 1.19 g/cc |
| Microhardness | 2.91 |
| Refractive Index | 1.65 |
| Abbe (vd) | 38 |

The refractive index is in the upper range of values attained by organic polymers, and the Abbe number is relatively low for high refractive index materials.

Example 2. Preparation of a High Refractive Index Polymer

Fabrication of a polymer according to the present invention was carried out by reacting tetravinylsilane and ethane-1,2-dithiol according to the following reaction sequence:

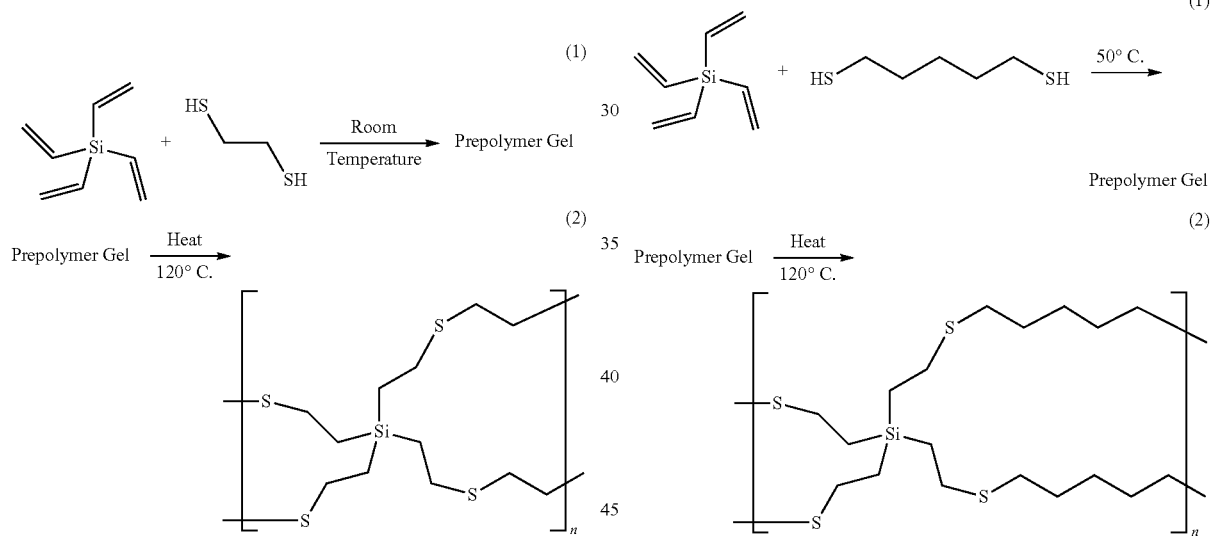

The reaction mixture was prepared by combining ethane-1,2-dithiol and tetravinylsilane in a molar ratio of 2 moles ethane-1,2-dithiol:1 mole of tetravinylsilane. To prepare the reaction mixture, ethane-1,2-dithiol (1.12 g) was homogeneously mixed with of tetravinylsilane (0.815 g) in a quartz container. The reaction mixture was thoroughly degassed by passing nitrogen gas, bubble by bubble, through the reaction mixture for about 10 minutes to remove oxygen and placed in a sealed glass and or Teflon container.

The reaction mixture (1.935 g) was then allowed to gel at room temperature which resulted in a partially cross-linked pre-polymer gel in about two days. The gel was then aged at room temperature for about three days and finally cured in an oven at 120° C. for a period of 24 hours.

The resulting cross-linked polymer was transparent, colorless, and hard. Measurement of the optical and selected physical properties of the polymer prepared by thiol-ene coupling ethane-1,2-dithiol and tetravinylsilane is given in Table 2.

TABLE 2

Physical Properties of the Polymer

| Measurement | Value |
| --- | --- |
| Specific Gravity | 1.19 g/cc |
| Microhardness | 2.91 |
| Refractive Index | 1.655 |
| Abbe (vd) | 38 |

Example 3. Preparation of a High Refractive Index Polymer

Fabrication of a polymer according to the present invention was carried out by reacting tetravinylsilane and pentane-1,5-dithiol according to the following reaction sequence:

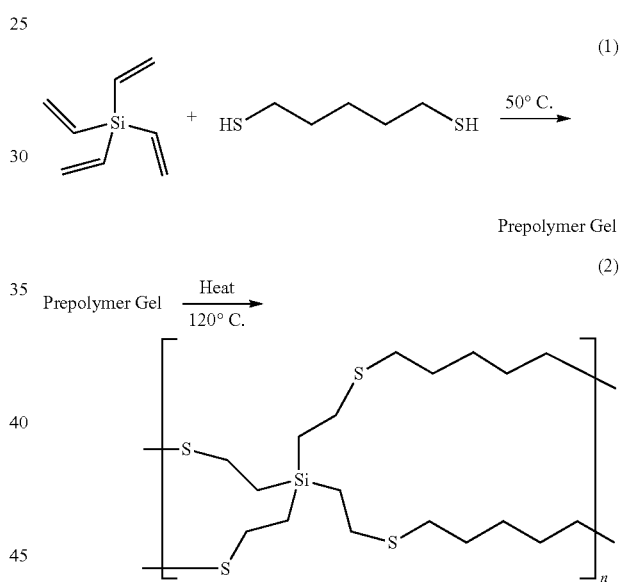

The reaction mixture was prepared by combining pentane-1,5-dithiol and tetravinylsilane in a molar ratio of 2 moles pentane-1,5-dithiol:1 mole tetravinylsilane. To prepare the reaction mixture, pentane-1,5-dithiol (1.625 grams) was homogeneously mixed with of tetravinylsilane (0.815 g) in a glass and or Teflon container. The reaction mixture was thoroughly degassed by passing nitrogen gas, bubble by bubble, through the reaction mixture for about 10 minutes to remove oxygen.

The reaction mixture (2.44 g) was then subjected to gelation at 50° C., which resulted in a partially cross-linked pre-polymer gel in about three days. The gel was then aged at 50° C. for about three days and finally cured in an oven at 120° C. for a period of 24 hours.

The resulting cross-linked polymer was transparent and colorless. Measurement of the optical and selected physical properties of the polymer prepared by thiol-ene coupling pentane-1,5-dithiol and tetravinylsilane is given in Table 3.

TABLE 3

Physical Properties of the Polymer

| Measurement | Value |
|---|---|
| Specific Gravity | 1.163 g/cc |
| Refractive Index | 1.590 |
| Abbe (vd) | 41 |

TABLE 4

Physical Properties of the Polymer

| Measurement | Value |
|---|---|
| Specific Gravity | 1.43 g/cc |
| Refractive Index | 1.687 |
| Abbe (vd) | 25.2 |

Example 4. Preparation of a High Refractive Index Polymer

Fabrication of a polymer according to the present invention was carried out by reacting tetravinylsilane and benzene-1,3-dithiol according to the following reaction sequence:

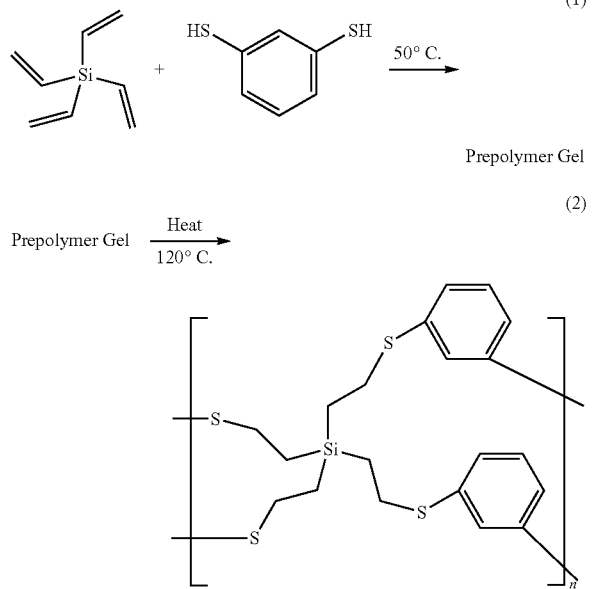

Example 5. Preparation of a High Refractive Index Polymer

Fabrication of a polymer according to the present invention was carried out by reacting 1,3,5-Triallyl-1,3,5-triazine-2,4,6(1H,3H,5H)-trione and benzene-1,3-dithiol according to the following reaction sequence:

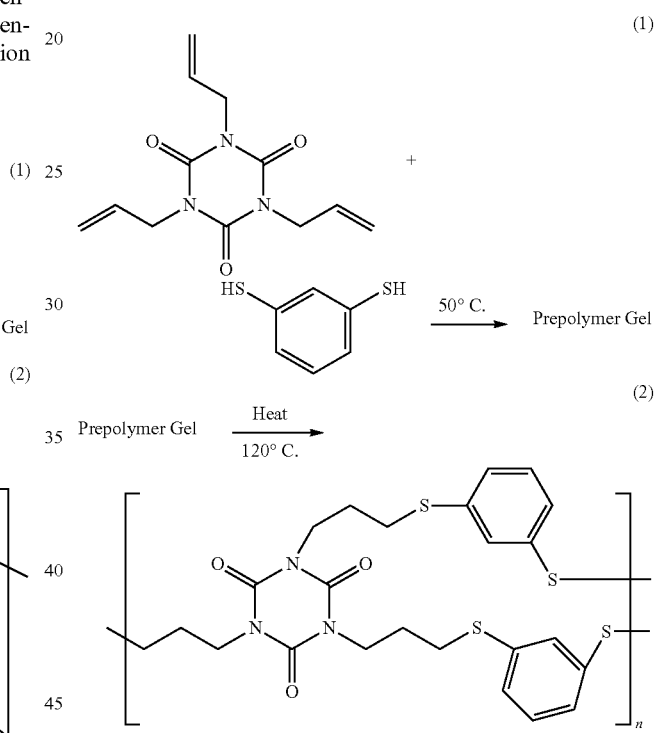

The reaction mixture was prepared by combining benzene-1,3-dithiol and tetravinylsilane in a molar ratio of 2 moles benzene-1,3-dithiol:1 mole tetravinylsilane. To prepare the reaction mixture, benzene-1,3-dithiol (1.706 g) was homogeneously mixed with of tetravinylsilane (0.815 g) in a glass vial. The reaction mixture was thoroughly degassed by passing nitrogen gas, bubble by bubble, through the reaction mixture for about 10 minutes to remove oxygen.

The reaction mixture (2.52 g) was then subjected to gelation at 50° C. which resulted in a partially cross-linked pre-polymer gel in about three days. The gel was then aged at 50° C. for about three days and finally cured in an oven at 120° C. for a period of 24 hours.

The resulting cross-linked polymer was transparent and yellow. Measurement of the optical and selected physical properties of the polymer prepared by thiol-ene coupling benzene-1,3-dithiol and tetravinylsilane is given in Table 4.

The reaction mixture was prepared by combining benzene-1,3-dithiol and 1,3,5-Triallyl-1,3,5-triazine-2,4,6(1H,3H,5H)-trione in a molar ratio of 1.5 moles benzene-1,3-dithiol:1 mole 1,3,5-Triallyl-1,3,5-triazine-2,4,6(1H,3H,5H)-trione. To prepare the reaction mixture, benzene-1,3-dithiol (1.984 g) was homogeneously mixed with of 1,3,5-Triallyl-1,3,5-triazine-2,4,6(1H,3H,5H)-trione (2.318 g) in a glass vial. The reaction mixture was thoroughly degassed by passing nitrogen gas, bubble by bubble, through the reaction mixture for about 10 minutes to remove oxygen.

The reaction mixture (4.3020 g) was then subjected for gelation at 50° C. which resulted in a partially cross-linked pre-polymer gel in about four days. The gel was then aged at 50° C. for about three days and finally cured in an oven at 120° C. for a period of 24 hours.

The resulting cross-linked polymer was transparent, colorless, and very hard. Measurement of the optical and selected physical properties of the polymer prepared by thiol-ene coupling benzene-1,3-dithiol and 1,3,5-Triallyl-1,3,5-triazine-2,4,6(1H,3H,5H)-trione is given in Table 5.

TABLE 5

Physical Properties of the Polymer

| Measurement | Value |
| --- | --- |
| Specific Gravity | 1.53 g/cc |
| Young's Modulus | 706 MPa |
| Refractive Index | 1.660 |
| Abbe (vd) | 28.7 |

TABLE 6

Physical Properties of the Polymer

| Measurement | Value |
| --- | --- |
| Specific Gravity | 1.143 g/cc |
| Refractive Index | 1.610 |
| Abbe (vd) | 36.3 |

Example 6. Preparation of a High Refractive Index Polymer

Fabrication of a polymer according to the present invention was carried out by reacting tetraallylsilane and ethane-1,2-dithiol was carried out according to the following reaction sequence:

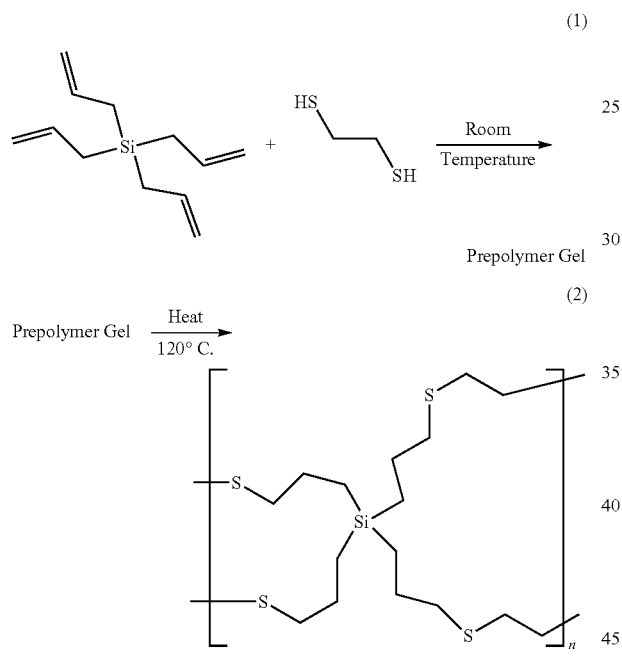

Example 7. Preparation of a High Refractive Index Polymer

Fabrication of a polymer according to the present invention was carried out by reacting tetraallylsilane and pentane-1,5-dithiol was carried out according to the following reaction sequence:

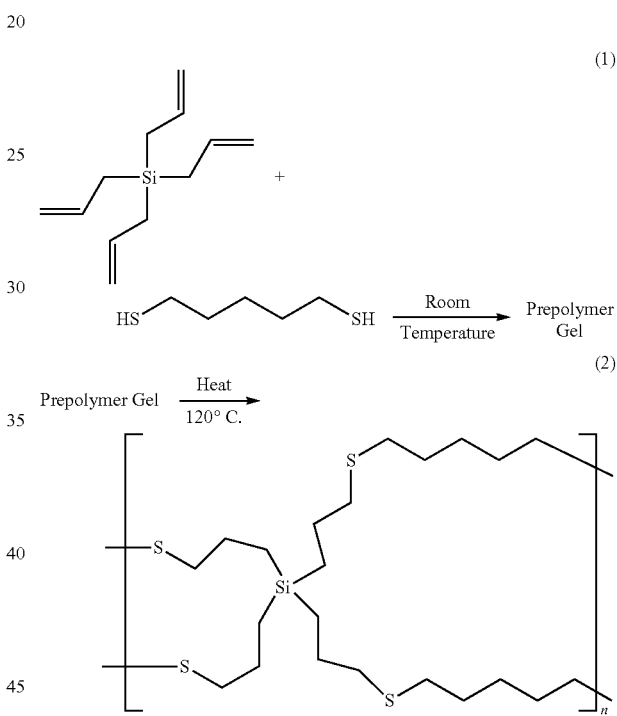

The reaction mixture was prepared by combining ethane-1,2-dithiol and tetraallylsilane in a molar ratio of 2 moles ethane-1,2-dithiol mole of tetraallylsilane. To prepare the reaction mixture, ethane-1,2-dithiol (0.816 g) was homogeneously mixed with tetraallylsilane (0.834 g) in a glass vial. The reaction mixture was thoroughly degassed by passing nitrogen gas, bubble by bubble, through the reaction mixture for about 10 minutes to remove oxygen and placed in a sealed glass and or Teflon container.

The reaction mixture (1.65 g) was then subjected for gelation at room temperature which resulted in a partially cross-linked pre-polymer gel in about two days. The gel was then aged at room temperature for about three days and finally cured in an oven at 120° C. for a period of 24 hours.

The resulting cross-linked polymer was transparent, yellowish, and soft. Measurement of the optical and selected physical properties of the polymer prepared by thiol-ene coupling ethane-1,2-dithiol and tetraallylsilane is given in Table 6.

The reaction mixture was prepared by combining pentane-1,5-dithiol and tetraallylsilane in a molar ratio of 2 moles pentane-1,5-dithiol mole of tetraallylsilane. To prepare the reaction mixture, pentane-1,5-dithiol (1.1831 g) was homogeneously mixed with tetraallylsilane (0.834 g) in a glass container. The reaction mixture was thoroughly degassed by passing nitrogen gas, bubble by bubble, through the reaction mixture for about 10 minutes to remove oxygen and placed in a sealed glass and or Teflon container.

The reaction mixture (2.017 g) was then subjected for gelation at room temperature which resulted in a partially cross-linked pre-polymer gel in about two days. The gel was then aged at room temperature for about three days and finally cured in an oven at 120° C. for a period of 24 hours.

The resulting cross-linked polymer was transparent and soft. Measurement of the optical and selected physical properties of the polymer prepared by thiol-ene coupling pentane-1,5-dithiol and tetraallylsilane is given in Table 7.

TABLE 7

| Physical Properties of the Polymer | |
|---|---|
| Measurement | Value |
| Specific Gravity | 1.323 g/cc |
| Refractive Index | 1.570 |
| Abbe (vd) | 41.5 |

Example 8. Preparation of a High Refractive Index Polymer

Fabrication of a polymer according to the present invention was carried out by reacting tetraallylsilane and 1 benzene-1,3-dithiol was carried out according to the following reaction sequence:

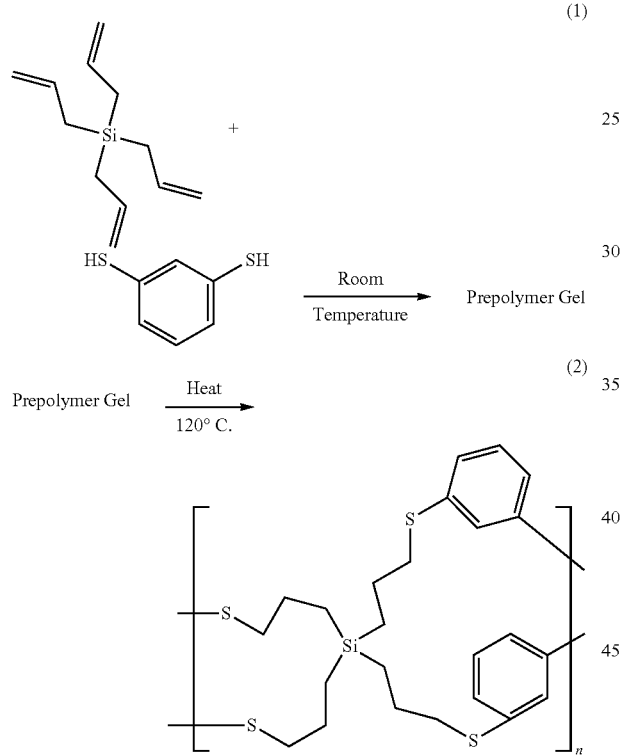

The reaction mixture was prepared by combining benzene-1,3-dithiol and tetraallylsilane in a molar ratio of 2 moles pentanedithiol:1 mole of tetraallylsilane. To prepare the reaction mixture, benzene-1,3-dithiol (1.236 g) was homogeneously mixed with tetraallylsilane (0.834 g) in a glass container. The reaction mixture was thoroughly degassed by passing nitrogen gas, bubble by bubble, through the reaction mixture for about 10 minutes to remove oxygen and placed in a sealed glass and or Teflon container.

The reaction mixture (2.07 g) was then subjected to gelation at room temperature which resulted in a partially cross-linked pre-polymer gel in about two days. The gel was then aged at room temperature for about three days and finally cured in an oven at 120° C. for a period of 24 hours.

The resulting polymer was poorly crosslinked and did not lead to formation of three dimensional bulk material.

Example 9. Preparation of a High Refractive Index Polymer

Fabrication of polymer according to the present invention was carried out by reacting tetraallylgermane and ethane-1,2-dithiol was carried out according to the following reaction sequence:

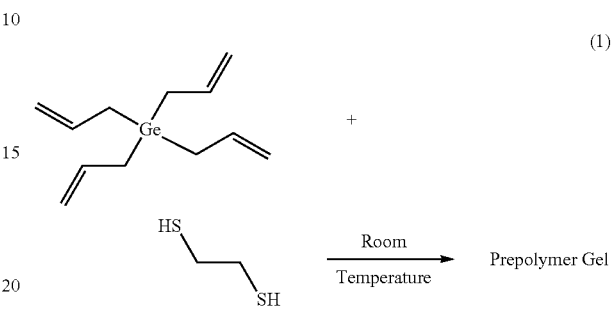

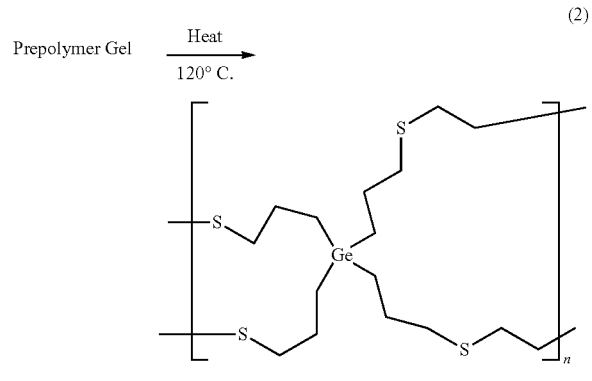

The reaction mixture was prepared by combining ethane-1,2-dithiol and tetraallylgermane in a molar ratio of 2 moles ethane-1,2-dithiol:1 mole of tetraallylgermane. To prepare the reaction mixture, ethane-1,2-dithiol (0.810 g) was homogeneously mixed with tetraallylgermane (1.015 g) in a glass container. The reaction mixture was thoroughly degassed by passing nitrogen gas, bubble by bubble, through the reaction mixture for about 10 minutes to remove oxygen and placed in a sealed glass and or Teflon container.

The reaction mixture (1.825 g) was then subjected for gelation at room temperature which resulted in a partially cross-linked pre-polymer gel in about two days. The gel was then aged at room temperature for about three days and finally cured in an oven at 120° C. for a period of 24 hours.

The resulting cross-linked polymer was transparent, yellowish, and hard. Measurement of the optical and selected physical properties of the polymer prepared by thiol-ene coupling ethane-1,2-dithiol and tetraallylgermane is given in Table 8.

TABLE 8

| Physical Properties of the Polymer | |
|---|---|
| Measurement | Value |
| Specific Gravity | 1.192 g/cc |
| Refractive Index | 1.62 |
| Abbe (vd) | 39.9 |

Example 10. Preparation of a High Refractive Index Polymer

Fabrication of polymer according to the present invention was carried out by reacting tetraallylgermane and pentane-1,5-dithiol was carried out according to the following reaction sequence:

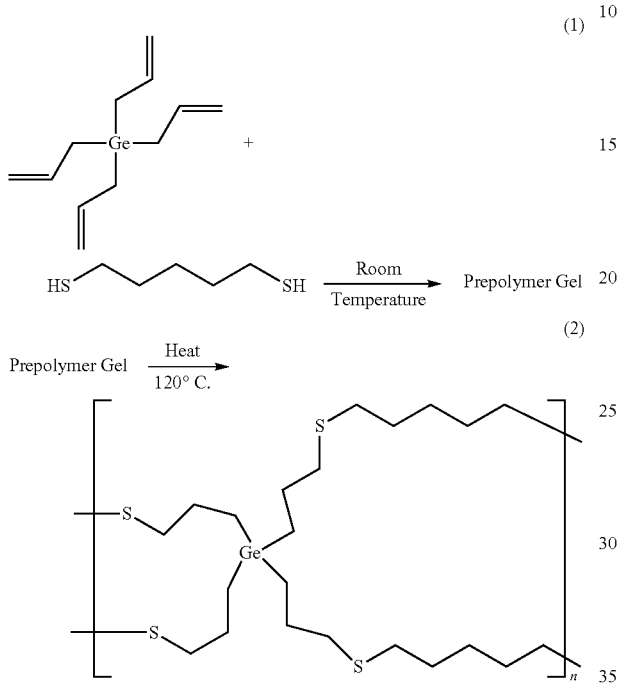

The reaction mixture was prepared by combining pentane-1,5-dithiol and tetraallylgermane in a molar ratio of 2 moles pentane-1,5-dithiol:1 mole of tetraallylgermane. To prepare the reaction mixture, pentane-1,5-dithiol (1.168 g) was homogeneously mixed with tetraallylgermane (1.015 g) in a glass container. The reaction mixture was thoroughly degassed by passing nitrogen gas, bubble by bubble, through the reaction mixture for about 10 minutes to remove oxygen and placed in a sealed glass and or Teflon container.

The reaction mixture (2.183 g) was then subjected for gelation at room temperature which resulted in a partially cross-linked pre-polymer gel in about two days. The gel was then aged at room temperature for about three days and finally cured in an oven at 120° C. for a period of 24 hours.

The resulting cross-linked polymer was transparent and soft. Measurement of the optical and selected physical properties of the polymer prepared by thiol-ene coupling pentane-1,5-dithiol and tetraallylgermane is given in Table 9.

TABLE 9

| Physical Properties of the Polymer | |
|---|---|
| Measurement | Value |
| Specific Gravity | 1.225 g/cc |
| Refractive Index | 1.59 |
| Abbe (vd) | 45 |

Example 11. Preparation of a High Refractive Index Polymer

Fabrication of polymer according to the present invention was carried out by reacting tetraallylgermane and benzene-1,3-dithiol was carried out according to the following reaction sequence:

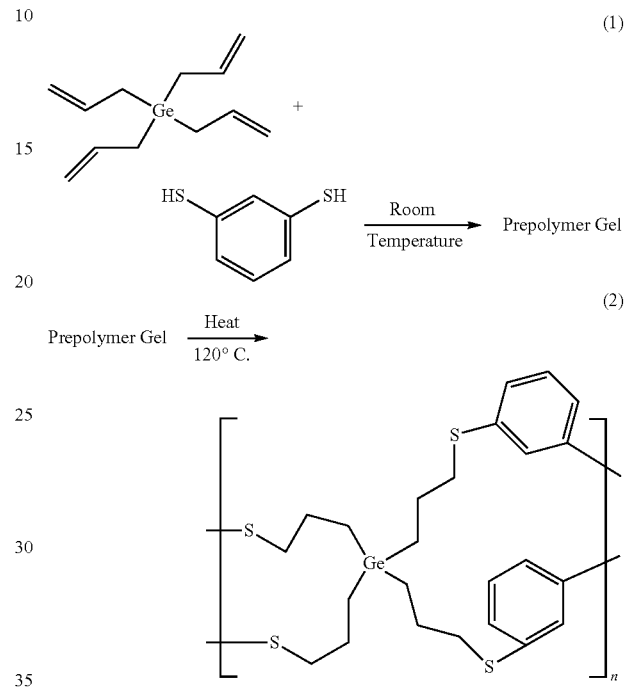

The reaction mixture was prepared by combining benzene-1,3-dithiol and tetraallylgermane in a molar ratio of 2 moles benzene-1,3-dithiol:1 mole tetraallylgermane. To prepare the reaction mixture, benzene-1,3-dithiol (1.223 g) was homogeneously mixed with of tetraallylgermane (1.015 g) in a glass vial. The reaction mixture was thoroughly degassed by passing nitrogen gas, bubble by bubble, through the reaction mixture for about 10 minutes to remove oxygen.

The reaction mixture (2.238 g) was then subjected for gelation at room temperature which resulted in a partially cross-linked pre-polymer gel in about three days. The gel was then aged at room temperature for another three days and finally cured in an oven at 120° C. for a period of 24 hours.

The resulting cross-linked polymer was transparent and hard. Measurement of the optical and selected physical properties of the polymer prepared by thiol-ene coupling benzene-1,3-dithiol and tetraallylgermane is given in Table 10.

TABLE 10

| Physical Properties of the Polymer | |
|---|---|
| Measurement | Value |
| Specific Gravity | 1.216 g/cc |
| Refractive Index | 1.69 |
| Abbe (vd) | 24.3 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. A composition prepared by a bulk polymerization method comprising forming a mixture consisting essentially of a first multifunctional monomer comprising alkenyl groups and a second multifunctional monomer comprising moieties that are reactive with alkenyl groups, reacting said first multifunctional monomer with said second multifunctional monomer to form a partially cross-linked prepolymer gel and thereafter curing the prepolymer to form a bulk polymer having the general structure (I):

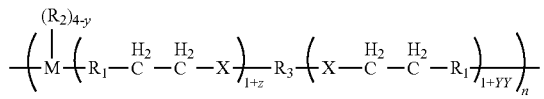

Structure (I)

wherein:
M is an organic moiety which has any of the following ring structures

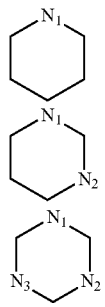

wherein each $N_1$, $N_2$, and $N_3$ is independently selected from the group consisting of N, O, S, Se, Sb, P, Ge, Sn, Te, Ga, In, Ni, Co, Ti, Zr, and W, and each methylene group is unsubstituted or substituted with a hydrocarbyl having 1 to 3 carbon atoms, O, N or S;

X is a main group element selected from the group consisting of S, P, Se and combinations thereof;

$R_1$ is, independently of any other $R_1$ in the polymer, a direct bond between M and the ethylene group depicted between M and X or a hydrocarbyl linking moiety having between 1 and about 9 carbon atoms;

$R_2$ is a hydrocarbyl moiety having between 1 and about 9 carbon atoms;

$R_3$ is an organic linking group;

Y has a value of 0, 1, 2, 3, or 4;

Z has a value of 0, 1, 2, 3, or 4;

YY has a value of 0, 1 or 2; and

Y, YY, and Z are such that the total number of moieties bonded to M is 3, 4, 5, or 6;

and n represents the number of repeat units in the polymer, and wherein at least 90% of functional groups in the bulk polymer are reacted.

2. The composition of claim 1 wherein the organic moiety has any of the following structures:

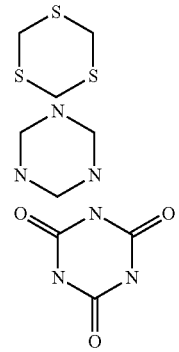

and each methylene group is unsubstituted or substituted with a hydrocarbyl having 1 to 3 carbon atoms, O, N or S.

3. The composition of claim 1 wherein X is selected from the group consisting of S and P.

4. The composition of claim 1 wherein the polymer has the structure (IVj):

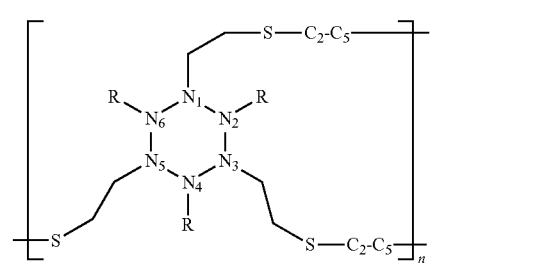

Structure (IVj)

wherein
$N_1$, $N_2$, $N_3$, $N_4$, $N_5$, and $N_6$ are each independently selected from the group consisting of C, N, O, and S; and each R is independently selected from the group consisting of hydrogen, hydrocarbyl having from 1 to 3 carbon atoms, O, N, and S.

5. The composition of claim 1 wherein the polymer has the structure (IVl):

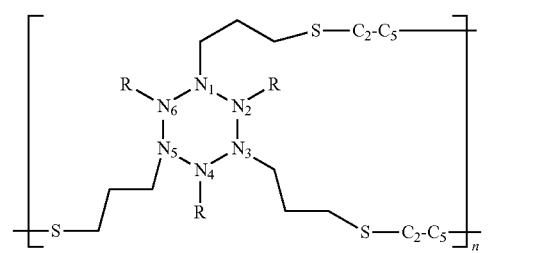

Structure (IVl)

wherein
$N_1$, $N_2$, $N_3$, $N_4$, $N_5$, and $N_6$ each independently are selected from the group consisting of C, N, O, and S; and each R are independently selected from the group consisting of hydrogen, hydrocarbyl having from 1 to 3 carbon atoms, O, N, and S.

6. The composition of claim 1 wherein the polymer has the structure (IVn):

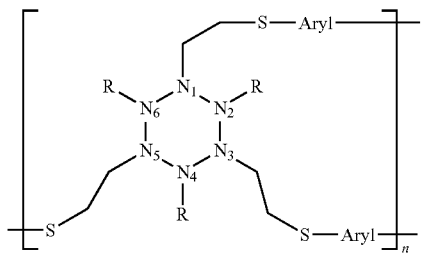

Structure (IVn)

wherein
$N_1$, $N_2$, $N_3$, $N_4$, $N_5$, and $N_6$ each independently are selected from the group consisting of C, N, O, and S; and each R is independently selected from the group consisting of hydrogen, hydrocarbyl having from 1 to 3 carbon atoms, O, N, and S.

7. The composition of claim 1 wherein the polymer has the structure (IVp):

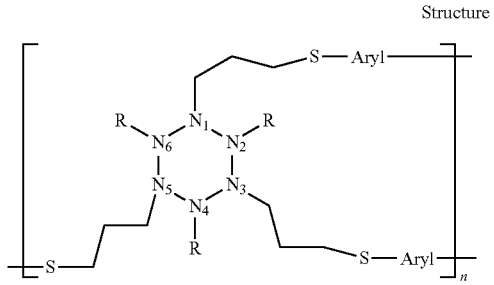

Structure (IVp)

wherein
$N_1$, $N_2$, $N_3$, $N_4$, $N_5$, and $N_6$ each independently are selected from the group consisting of C, N, O, and S; and each R is independently selected from the group consisting of hydrogen, hydrocarbyl having from 1 to 3 carbon atoms, O, N, and S.

8. The composition of claim 1 wherein the polymer has Structure (IVq):

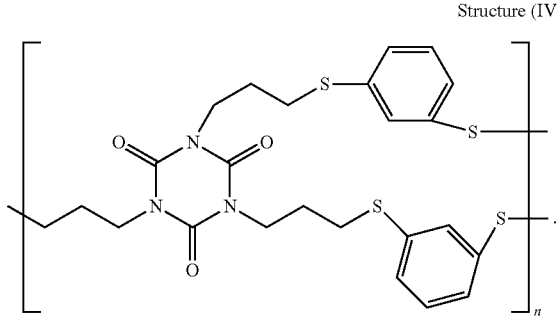

Structure (IVq)

9. A composition as set forth in claim 1 prepared by a bulk polymerization method comprising forming a mixture consisting essentially of a first multifunctional monomer comprising vinyl groups and having the general structure (IV):

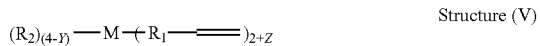

Structure (V)

with a second multifunctional monomer comprising moieties that are reactive with vinyl groups and having the structure (XXIII)

$R_3$—$(XH)_{2+YY}$   Structure (XXIII);

wherein M, $R_1$, $R_2$, $R_3$, X, Y, Z, and YY are as defined in structure (IIIA); and reacting said first multifunctional monomer with said second multifunctional monomer to form a partially cross-linked prepolymer gel and thereafter curing the prepolymer to form the bulk polymer.

10. A method of forming a polymer having the general structure (I):

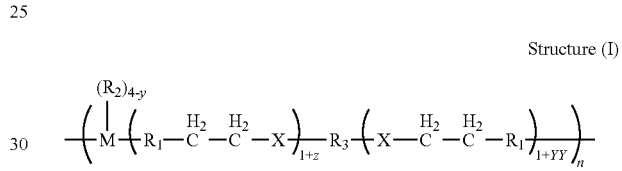

Structure (I)

wherein:
M is an organic moiety which has any of the following ring structures

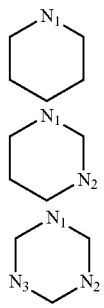

wherein each $N_1$, $N_2$, and $N_3$ is independently selected from the group consisting of N, O, S, Se, Sb, P, Ge, Sn, Te, Ga, In, Ni, Co, Ti, Zr, and W, and each methylene group is unsubstituted or substituted with a hydrocarbyl having 1 to 3 carbon atoms, O, N or S;

X comprises a main group element selected from the group consisting of S, P, Se, and combinations thereof;

$R_1$ is, independently of any other $R_1$ in the polymer, a direct bond between M and the ethylene group depicted between M and X or a hydrocarbyl linking moiety having between 1 and about 9 carbon atoms;

$R_2$ is a hydrocarbyl moiety having between 1 and about 9 carbon atoms;

$R_3$ is an organic linking group;

Y has a value of 0, 1, 2, 3, or 4;

Z has a value of 0, 1, 2, 3, or 4;

YY has a value of 0, 1 or 2; and

Y, YY, and Z are such that the total number of moieties bonded to M is 3, 4, 5, or 6;

and n represents the number of repeat units in the polymer;

the method comprising forming a mixture consisting essentially of a first multifunctional monomer comprising vinyl groups having general structure (IV):

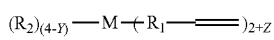  Structure (V)

and a second multifunctional monomer comprising groups that are reactive with vinyl groups having general structure (XXIII)

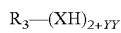  Structure (XXIII);

wherein M, $R_1$, $R_2$, $R_3$, X, Y, Z, and YY are as defined in connection with Structure (I), and wherein the reaction comprises reacting said first multifunctional monomer with said second multifunctional monomer to form a partially cross-linked prepolymer gel and therefter curing the prepolymer gel to yield a product structure (I) wherein at least about 90% of the functional groups of the multifunctional monomers groups have reacted.

11. The method of claim 10 wherein X is selected from the group consisting of S and P.

12. A method for forming a polymer having a structure (VIb):

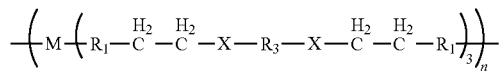  Structure (IIIa)

wherein:
M is an organic moiety;
X is selected from the group consisting of S, P, and As; and
$R_1$ is, independently of any other $R_1$ in the polymer, a direct bond between M and the ethylene group depicted between M and X or a hydrocarbyl linking moiety having between 1 and about 9 carbon atoms;

$R_3$ is an organic linking group selected from the group consisting of alkyl, substituted alkyl, alkenyl, substituted alkenyl, alkynyl, substituted alkynyl, or aromatic, the method comprising:

forming a reaction mixture comprising a first multifunctional monomer having the structure (VIb):

  Structure (VIb)

and a second multifunctional monomer having general structure (XXIV)

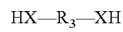  Structure (XXIV);

wherein M, $R_1$, $R_3$, and X are as defined above; and reacting said first multifunctional monomer with said second multifunctional monomer to form a partially cross-linked prepolymer gel and therefter curing the prepolymer gel to yield a product structure (I) wherein at least about 90% of the functional groups of the multifunctional monomers groups have reacted.

13. The method of claim 12 wherein the polymer has a structure:

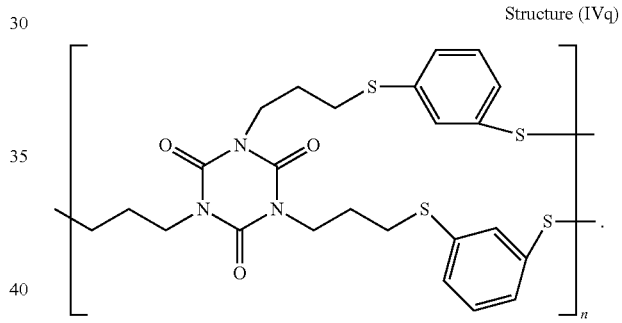  Structure (IVq)

* * * * *